(12) United States Patent
Kim et al.

(10) Patent No.: US 7,652,406 B2
(45) Date of Patent: Jan. 26, 2010

(54) APPARATUS FOR DRIVING DRUM OF WASHING MACHINE

(75) Inventors: Pyung Kyu Kim, Seoul (KR); Kyu Hyuk Jeong, Kwacheon-si (KR); Hyung Geun Song, Suwon-si (KR); Sang Han Lee, Seoul (KR)

(73) Assignee: Amotech Co., Ltd., Kyungki-do (KR)

( * ) Notice: Subject to any disclaimer, the term of this patent is extended or adjusted under 35 U.S.C. 154(b) by 0 days.

(21) Appl. No.: 12/285,479

(22) Filed: Oct. 7, 2008

(65) Prior Publication Data

US 2009/0079286 A1 Mar. 26, 2009

Related U.S. Application Data

(62) Division of application No. 11/979,079, filed on Oct. 31, 2007, now Pat. No. 7,443,074, which is a division of application No. 11/281,427, filed on Nov. 18, 2005, now Pat. No. 7,356,906, which is a division of application No. 10/492,176, filed on Apr. 9, 2004, now Pat. No. 6,992,419.

(51) Int. Cl.
*H02K 1/22* (2006.01)
(52) U.S. Cl. ........................... 310/266; 310/254; 310/43
(58) Field of Classification Search .................. 310/43, 310/112–114, 216.1, 266, 156.1, 254, 257–259
See application file for complete search history.

(56) References Cited

U.S. PATENT DOCUMENTS

| 6,396,190 | B1* | 5/2002 | Ahn et al. | 310/429 |
|---|---|---|---|---|
| 6,992,419 | B2* | 1/2006 | Kim et al. | 310/266 |
| 7,147,929 | B2* | 12/2006 | Amagi et al. | 428/480 |
| 7,218,026 | B2* | 5/2007 | Murakami et al. | 310/216.069 |
| 7,356,906 | B2* | 4/2008 | Kim et al. | 29/596 |
| 7,443,074 | B2* | 10/2008 | Kim et al. | 310/266 |
| 2004/0124733 | A1* | 7/2004 | Yamamoto et al. | 310/218 |
| 2005/0035672 | A1* | 2/2005 | Ward et al. | 310/54 |
| 2005/0035678 | A1* | 2/2005 | Ward et al. | 310/156.37 |
| 2005/0035680 | A1* | 2/2005 | Murakami et al. | 310/254 |
| 2005/0285456 | A1* | 12/2005 | Amagi et al. | 310/43 |
| 2007/0205682 | A1* | 9/2007 | Choi et al. | 310/114 |

* cited by examiner

*Primary Examiner*—Thanh Lam
(74) *Attorney, Agent, or Firm*—Rosenberg, Klein & Lee

(57) ABSTRACT

A radial core type double rotor brushless direct-current motor is provided in which a double rotor structure is employed with inner and outer rotors which are doubly disposed and thus a stator core is completely divided. The motor includes a rotational shaft which is rotatably mounted on a housing of an apparatus, cylindrical inner and outer yokes which are rotatably mounted on the center of the housing, inner and outer rotors including a number of magnets which are mounted with the opposing polarities on the outer surface of the inner yoke and the inner surface of the outer yoke, and a number of cores assemblies which are installed between the inner and outer rotors in which a number of coils are wound around a number of division type cores, respectively.

9 Claims, 27 Drawing Sheets

DETAIL A

TOX

TOX FLAT

SPOT WELDING

RIVETING

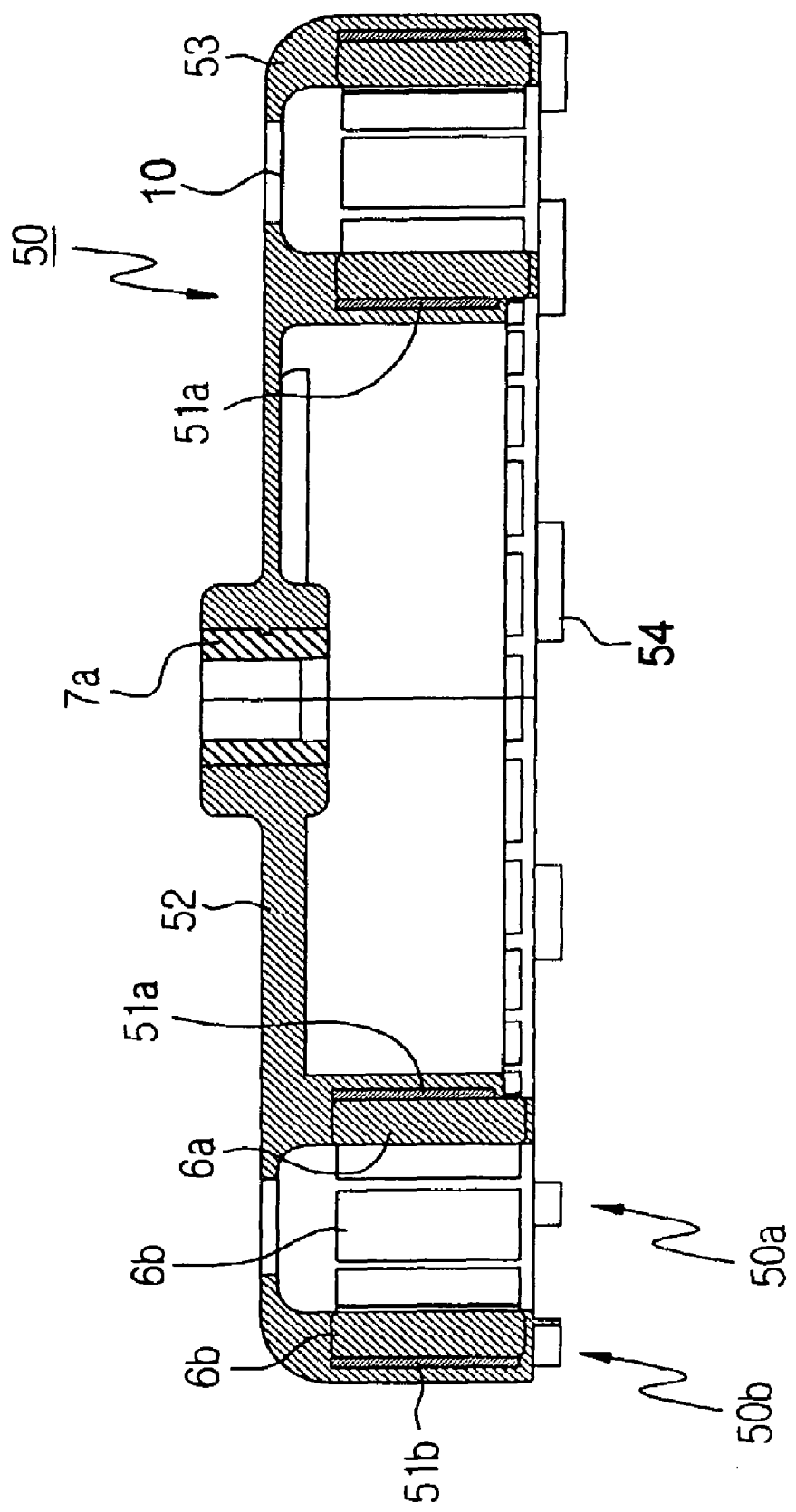

APPARATUS FOR DRIVING DRUM OF WASHING MACHINE

RELATED APPLICATIONS

This application is a Divisional patent application of application Ser. No. 11/979,079, filed on 31 Oct. 2007 now U.S. Pat. No. 7,443,074 which is a Divisional patent application of Ser. No. 11/281,427, filed on 18 Nov. 2005 now U.S. Pat. No. 7,356,906 which is a Divisional patent application of Ser. No. 10/492,176 filed on 9 Apr. 2004, now U.S. Pat. No. 6,992,419.

TECHNICAL FIELD

The present invention relates to a radial core type brushless direct-current (BLDC) motor, and more particularly, to a brushless direct-current (BLDC) motor having a radial core type double rotor structure in which double rotors are disposed in the inner and outer sides of a stator, respectively in a radial core type motor, to thereby enable a complete division of a stator core and thus enhance productivity of coil windings and a motor output.

BACKGROUND ART

A BLDC motor can be classified into a core type (or radial type) and a coreless type (or axial type), each having a generally cup-shaped (cylindrical) structure, according to whether or not a stator core exists.

A BLDC motor of a core type structure is classified into an internal magnet type of FIG. 2 including a cylindrical stator where coils are wound on a number of protrusions formed on the inner circumferential portion thereof in order to form an electronic magnet structure, and a rotor formed of a cylindrical permanent magnet, and an external magnet type of FIG. 1 including a stator where coils are wound up and down on a number of protrusions formed on the outer circumferential portion thereof, and a rotor formed of a cylindrical permanent magnet on the outer portion of which multiple poles are magnetized.

In the external magnet type BLDC motor as shown in FIG. 1, stator cores 101a around which coils (not shown) are wound are installed on the base of a stator through a supporter, respectively. A cup-shaped rotor 101c is installed through a central rotational shaft 101d, in which the rotor 101c is freely rotated through a bearing installed on the center of the stator, and a cylindrical permanent magnet 101b is attached to the inner circumferential portion of the rotor, to form a predetermined crevice, that is, a gap G with respect to the stator.

When power is applied to the FIG. 1 motor, a magnetic field is created around the coils wound on the stator cores 101a of the stator. Accordingly, a rotor case is rotated by a mutual action with a magnetic flux by the permanent magnet 101b mounted on the rotor 101c.

In the conventional BLDC motor, a main path of the magnetic flux is a magnetic circuit which forms a closed circuit starting from the permanent magnet and proceeding toward the permanent magnet again and a yoke via the gap and the stator core of the stator.

In the internal magnet type BLDC motor as shown in FIG. 2, a plurality of T-shaped core portions 202c on a stator core around which coils are wound, protrude inwards. Also, the inner sides of the respective core portions form a cylinder of a predetermined diameter. Also, a rotor 202f having a cylindrical permanent magnet including a rotational shaft 202d, or a ring-shaped permanent magnet 202b attached to a cylindrical yoke 202 including a central rotational shaft, is mounted in the inner portion of the cylinder surrounded by the core portions 202c. The internal magnet type BLDC motor rotates in the same manner as that of the external magnet type BLDC motor.

The magnetic circuit in the above-described core type BLDC motor has a symmetrical structure in the radial direction around the rotational shaft. Accordingly, the core type BLDC motor has less axial vibratory noise, and is appropriate for low-speed rotation. Also, since a portion occupied by a gap with respect to the direction of the magnetic path is extremely small, a high magnetic flux density can be obtained even if a low performance magnet is used or the number of magnets is reduced. As a result, a big torque and a high efficiency can be obtained.

However, such a yoke structure causes loss of a yoke material when fabricating a stator. In addition, a special-purpose expensive dedicated winding machine must be used for winding coils around the yoke during mass-production, because the yoke structure is complicated. Also, since a mold for fabricating a stator is expensive, initial investment costs become high.

Meanwhile, in order to improve the shortcomings of the above-described core type BLDC motor, a conventional coreless type BLDC motor proposed by the same applicant as that of the present invention is disclosed in U.S. Pat. No. 5,945,766, as an axial type which is a double rotor type BLDC motor for offsetting axial vibration generated when rotors rotate and simultaneously increasing a torque more than two times.

Between first and second rotors is installed a stator in the above conventional coreless type BLDC motor is installed at a distance by a predetermined gap with respect to the first and second rotors. Around the stator are wound a plurality of bobbin-less coils for applying an electromagnetic force to the first and second rotors in response to an applied DC current. Also, current is applied to the coils so that magnetic fluxes which have identical axial polarities are generated when magnets corresponding to the first and second rotors have opposite polarities, and current is supplied to the first and second rotors so that electromagnetic forces are generated in the opposing directions to each other.

In the case of the axial double rotor type BLDC motor, a stator is disposed in the middle of the first and second rotors, in a manner that a magnetic circuit of a symmetrical structure is formed with respect to the stator and the rotational shaft. Accordingly, because of the first and second rotors and the stator, the number of stator coils are increased two times and the number of field magnets are also increased two times as many as a single rotor structure. Therefore, driving current and magnetic flux density are increased two times. As a result, the axial double rotor type BLDC motor can obtain torque at least two times as much as an identical axial single rotor structure.

The axial coreless type motor has various kinds of merits. However, since a portion occupied by armature windings includes an air gap, a magnetic resistance is high and thus a magnetic flux density is low in comparison with the number of magnets.

In other words, in the case of a magnetic circuit formed by magnets m1 to m4 as shown in FIG. 3, a magnetic resistance is increased very largely at an air gap G formed between magnets m1 and m2 and between magnets m3 and m4, and thus a loss of the magnetic flux occurs. As a result, an efficiency of the motor is lowered.

Also, it requires that an air gap become wider in order to increase the number of turns of armature windings for implementing a high torque motor. For this reason, a magnetic flux density would rather decrease, and thus a motor efficiency further decreases.

Thus, the axial coreless type motor should use higher performance magnets and the more number of magnets, in comparison with a radial core type motor of an equivalent output, and finally may raise production cost.

However, although the axial coreless gap type motor has the above-described various kinds of advantages, it is in a more disadvantageous position than a radial type motor, in view of axial vibration.

Meanwhile, in the case of a radial core type motor, a special-purpose dedicated winding machine should be used for winding coils around the above-described integrated stator core. Accordingly, there have been a number of proposals in order to solve the problems that the initial investment cost becomes very high, and productivity of winding coils around the stator core is low.

For example, in order to separate inner/outer wheels forming a core in an internal magnet type core motor, a stator structure has been altered from an integration type to a division type, to thus facilitate winding of coils, or a coil winding method for cores has been altered without changing an integration type core structure, to thus enhance workability in winding coils.

Meanwhile, an inner/outer double rotor type motor has been proposed for a radial core type motor. However, this motor has only intended to simply increase the number of permanent magnets and utilize an empty space, to thereby enhance a motor output, and the stator structure has had still an integration structure. Thus, the existing problems of the low coil winding workability, the high material loss, the high investment cost for the winding machine, etc., still remain, and the coil windings should be provided doubly at the inner/outer sides of the stator core.

Also, a winding machine for winding coils at the inner side of the core and that for winding coils at the outer side of the core cannot be commonly used. As a result, the investment cost for winding machines increases as much as an increase in the motor output.

In addition to the above-described conventional art, a plurality of division type core structure motors have been proposed for a radial core type motor, in order to increase productivity of winding coils of the stator core and reduce the investment cost for winding machines.

DISCLOSURE OF THE INVENTION

To solve the above problems, it is an object of the present invention to provide a brushless direct-current (BLDC) motor having a radial core type double rotor structure in which permanent magnet rotors are disposed in the inner and outer sides of a stator core, respectively, to thus form a magnetic circuit by the inner and outer permanent magnets and rotor yokes and to thereby enable a complete division of a stator core and thus greatly enhance productivity of coil windings and a motor output.

It is another object of the present invention to provide a brushless direct-current (BLDC) motor having a radial core type double rotor structure which can make the most of merits of an axial double rotor type and a radial core type and improve demerits thereof.

It is still another object of the present invention to provide a brushless direct-current (BLDC) motor having a radial core type double rotor structure which can greatly enhance productivity of assembling a stator by a stator structure capable of wiring coils by automatically positioning and fixing a plurality of stator core assemblies to a core support plate when employing a double rotor and division type stator core structure.

It is yet another object of the present invention to provide a brushless direct-current (BLDC) motor having a radial core type double rotor structure having an integrated double rotor structure which can enhance durability and reliability by integrally molding the inner and outer rotors and bushings via an insert molding method using thermosetting resin.

It is yet still another object of the present invention to provide a brushless direct-current (BLDC) motor having a radial core type double rotor structure adapted as a driving source of a drum for a washing machine which requires waterproof by integrally molding a stator via an insert molding method using thermosetting resin and combining the stator together with the integrated double rotors.

It is a further object of the present invention to provide a method of manufacturing a brushless direct-current (BLDC) motor having a radial core type double rotor structure.

To accomplish the above object of the present invention, according to an aspect of the present invention, there is provided a brushless direct-current (BLDC) motor having a radial core type double rotor structure, the BLDC motor comprising: a rotational shaft which is rotatably mounted in a housing of the motor; double rotors including an inner rotor and an outer rotor in which a central portion of the inner rotor and the outer rotor is combined with the rotational shaft via a bushing and is rotatably supported, a plurality of N-pole and S-pole magnets are disposed alternately in annular form on different concentric circumferences in each rotor, and opposing magnets with a predetermined distance between the inner and outer rotors are disposed to have opposite polarities; and an integrated stator fixed to the housing of the motor, in which a plurality of stator core assemblies are temporarily assembled to an annular core support plate enabling automatic positioning and then are integrally formed into a single body in annular form via an insert molding using thermosetting resin, and a mutually same air gap is formed between the inner and outer rotors, each of said stator core assemblies being wound by coil around a bobbin which includes a plurality of division type stator cores, wherein a magnetic circuit is formed via the magnets disposed in opposite polarities in the inner and outer rotors and the division type stator cores positioned between the inner rotor and the outer rotor.

The integrated stator comprises: a number of division type stator cores; a number of insulation bobbins surrounding the number of division type stator cores; a number of coils wound around the outer circumference of each bobbin; an annular core support plate which accommodates and supports the number of stator core assemblies on the upper surface thereof with a predetermined interval where coils are wound around the bobbin and simultaneously wiring the number of coils by phase; an automatic positioning and supporting unit which automatically positions and supports the number of stator core assemblies to the core support plate with the predetermined interval; and a stator support which molds the upper surface with thermosetting resin in order to integrate the annular core support plate to which the number of stator core assemblies are supported.

The automatic positioning and supporting unit comprises: inner and outer guide flanges which are vertically extended to the inner and outer sides of the core support plate, for accommodating and supporting the lower portions of the number of stator core assemblies therein; a number of first coupling protrusions which are extended with an identical interval facing the upper ends of the inner and outer guide flanges, and disposed between the adjacent stator core assemblies when the number of stator core assemblies are assembled on the core support plate, thereby restricting the stator core assemblies from moving in the circumferential direction; and a number of second coupling protrusions which are extended between the number of first coupling protrusions with an identical interval facing the upper ends of the inner and outer guide flanges, and are combined with first and second coupling grooves which are vertically formed on the inner and outer sides of the stator core when the number of stator core assemblies are assembled on the core plate, thereby restricting the stator core assemblies from moving forward and backward with respect to the axial direction, wherein the number of stator core assemblies are automatically positioned with a predetermined interval when being combined with the number of first and second coupling protrusions.

Also, the automatic positioning and supporting unit comprises: a number of first coupling protrusions which are vertically extended to the inner side of the core support plate, with an identical interval, and disposed between the inner sides of the adjacent stator core assemblies when the number of stator core assemblies are assembled on the core support plate, thereby restricting the stator core assemblies from moving in the circumferential direction; and a number of second coupling protrusions which are vertically extended to the outer side of the core support plate with an identical interval facing the number of first coupling protrusions, and are disposed between the outer sides of the adjacent stator core assemblies when the number of stator core assemblies are assembled on the core plate, thereby restricting the stator core assemblies from moving forward and backward with respect to the circumferential and axial directions, wherein the number of stator core assemblies are automatically positioned with a predetermined interval when being combined with the number of first and second coupling protrusions.

Further, the automatic positioning and supporting unit comprises: a number of first and second coupling protrusions which are extended to the lower portions of the inner and outer flanges in the number of insulation bobbins; and a number of first and second coupling grooves facing each other with a predetermined interval on an identical circumference along the inner and outer sides so that the first and second coupling protrusions are combined on the bottom of the core support plate, wherein the number of stator core assemblies are automatically positioned with a predetermined interval when being combined with the number of first and second coupling grooves.

The core support plate further comprises: a number of conductive lines printed on the lower surface of the core support plate in order to mutually wire the number of coils by phase; and a number of coupling holes which are formed on the ends of each of the number of conductive lines, to penetrate the core support plate, and takes out the number of both ends of the coils from the number of stator core assemblies to the lower surface.

Also, the BLDC motor further comprises an extension portion which is extended in the central direction of the stator support bodies and used to be coupled with the housing of the motor.

Meanwhile, the double rotors comprises: a first yoke frame whose inner end is connected to the bushing and a first bent portion of the other end is perpendicularly bent to form a cup shape; a second yoke frame which is integrally combined with the first yoke frame, and whose inner end is connected to the bushing and a second bent portion of the other end is perpendicularly bent to maintain a predetermined distance with respect to the first bent portion of the first yoke frame; a plurality of first N-pole and S-pole magnets disposed alternately in annular form on the outer circumferential surface of the first bent portion; and a plurality of second N-pole and S-pole magnets disposed alternately in annular form on the inner circumferential surface of the second bent portion, in which magnets facing the plurality of the first N-pole and S-pole magnets are disposed to have opposite polarities.

Also, the double rotors comprises: an inner rotor having an inner yoke formed into a cylindrical shape, and a plurality of first N-pole and S-pole magnets which are disposed alternately in annular form on the outer circumferential surface of the inner yoke; an outer rotor having an outer yoke having a relatively larger diameter than that of the inner yoke so as to maintain a predetermined distance from the inner yoke, and a plurality of second N-pole and S-pole magnets disposed alternately in annular form on the inner circumferential surface of the outer yoke, in which magnets facing the plurality of the first N-pole and S-pole magnets are disposed to have opposite polarities; and a rotor support which is integrated in annular form other than the opposing magnets in the inner and outer rotors, to simultaneously form a space where the stator is inserted between the inner and outer rotors, and is molded with thermosetting resin so that the inner end thereof is connected to the outer circumferential surface of the bushing.

The motor according to the present invention has an integrated structure that the rotor and stator are molded with thermosetting resin. Thus, the motor according to the present invention is appropriately used for driving a washing machine drum.

According to another aspect of the present invention, there is provided a brushless direct-current (BLDC) motor having a radial core type double rotor structure, the BLDC motor comprising: a rotational shaft which is rotatably mounted in a housing of the motor; double rotors including an inner rotor and an outer rotor in which a central portion of a yoke frame is combined with the rotational shaft via a bushing and is rotatably supported, a plurality of N-pole and S-pole magnets are disposed alternately in annular form on different concentric circumferences in each rotor, and opposing magnets with a predetermined distance between the inner and outer rotors are disposed to have opposite polarities; and an annular stator which is installed with an air gap between the inner and outer rotors.

According to still another aspect of the present invention, there is provided a method of manufacturing a brushless direct-current (BLDC) motor having a radial core type double rotor structure, the BLDC motor manufacturing method comprising the steps of: molding a number of T-shaped division type stator core by using a magnetic material; winding coils around an insulation bobbin which can cover the outer circumference of the core; preparing a number of stator core assemblies where coils are wound by inserting a pair of T-shaped cores into the coils-wound bobbin in both directions of the bobbin and bonding the pair of cores by caulking; preparing an integrated stator by aligning and fixing the number of the coils-wound stator core assemblies on a printed circuit board (PCB), wiring coils, and molding the stator core assemblies in an annular form by an insert molding method using thermosetting resin; and assembling the integrated stator so as to be positioned between the double rotors in which the inner rotor and outer rotor are aligned in a radial type.

According to yet another aspect of the present invention, there is provided a method of manufacturing a brushless direct-current (BLDC) motor having a radial core type double rotor structure, the BLDC motor manufacturing method comprising the steps of: molding a number of T-shaped division type stator core by using a magnetic material; winding coils around a number of insulation bobbins which can cover the outer circumference of the core; preparing a number of stator core assemblies where coils are wound by inserting a T-shaped core into each of the coils-wound bobbins; preparing an integrated stator by aligning and fixing the number of the coils-wound stator core assemblies on a an annular core support plate, wiring coils, and molding the stator core assemblies in an annular form by an insert molding method using thermosetting resin; and assembling the integrated stator so as to be positioned between the double rotors in which the inner rotor and outer rotor are aligned in a radial type.

According to yet still another aspect of the present invention, there is provided a method of manufacturing a brushless direct-current (BLDC) motor having a radial core type double rotor structure, the BLDC motor manufacturing method comprising the steps of: molding a number of I-shaped division type stator core by using a magnetic material; molding upper and lower insulation bobbins which are divided up and down so as to cover the outer circumference of the core; preparing a number of division type stator core assemblies where coils are wound by wiring coils around the assembled bobbins at the state of assembling the upper and lower bobbins into the upper and lower portions of the I-shaped core; preparing an integrated stator by molding the coils-wound stator core assemblies in an annular form by an insert molding method using thermosetting resin; and assembling the integrated stator so as to be positioned between the radial type double rotors.

According to a further aspect of the present invention, there is provided a method of manufacturing a brushless direct-current (BLDC) motor having a radial core type double rotor structure, the BLDC motor manufacturing method comprising the steps of: integrally molding an insulation bobbin having first and second flanges at both sides thereof and surrounding a middle portion an I-shaped stator core around which coils are wound by an insert molding method using thermosetting resin; preparing a number of stator core assemblies by winding coils between the first and second flanges of the bobbin; wiring both ends of the coils taken out to the lower surface of a core support plate at the state of temporarily assembling the number of the stator core assemblies on a core support plate having a number of automatic positioning coupling protrusions formed on the inner and outer ends thereof; preparing an integrated stator by molding the coils-wound stator core assemblies other than the inner and outer sides of the division type stator core in an annular form by an insert molding method using thermosetting resin; and assembling the integrated stator so as to be positioned between the double rotors in which an inner rotor and an outer rotor are aligned in radial type.

According to a further still aspect of the present invention, there is provided a method of manufacturing a brushless direct-current (BLDC) motor having a radial core type double rotor structure, the BLDC motor manufacturing method comprising the steps of: integrally molding a bobbin on the outer circumference of a stator core by an insert molding method using thermosetting resin, in such a manner that the stator core is inserted into a hollow portion of a vessel portion of a bobbin, and at least one connection pin is inserted into the corners of first and second flanges opposing to each other in the bobbin; preparing a number of stator core assemblies by winding coils between the first and second flanges of the bobbin; mutually wiring coils by phase by connecting one end of the coils to one end of the connection pin and connecting the other end of the connection pin taken out to the lower surface of the core support plate to a conductive line printed on the lower surface of the core support plate, at the state of temporarily assembling the number of the stator core assemblies on a core support plate having a number of automatic positioning coupling protrusions formed on the inner and outer ends thereof; preparing an integrated stator by molding the stator core assemblies other than the inner and outer sides of the division type stator core in an annular form by an insert molding method using thermosetting resin; and assembling the integrated stator so as to be positioned between the double rotors in which an inner rotor and an outer rotor are aligned in radial type.

According to a further still aspect of the present invention, there is provided a method of manufacturing a brushless direct-current (BLDC) motor having a radial core type double rotor structure, the BLDC motor manufacturing method comprising the steps of: integrally molding an insulation bobbin having first and second flanges at both sides thereof in which first and second coupling protrusions are provided on the lower end of the first and second flanges, and surrounding a middle portion an I-shaped stator core around which coils are wound by an insert molding method using thermosetting resin; preparing a number of stator core assemblies by winding coils between the first and second flanges of the bobbin; wiring both ends of each coil at the state of inserting and temporarily assembling the first and second coupling protrusions of the number of the stator core assemblies into a number of mutually opposing automatic positioning coupling holes formed concentrically on the inner and outer ends of an annular core support plate; preparing an integrated stator by molding the coils-wound stator core assemblies other than the inner and outer sides of the division type stator core in an annular form by an insert molding method using thermosetting resin; and assembling the integrated stator so as to be positioned between the double rotors in which an inner rotor and an outer rotor are aligned in radial type.

In this case, the double rotors are integrated in an annular form, respectively, except for the opposing magnets in the inner and outer rotors, and are molded with thermosetting resin so that the inner end is connected to the outer circumference of the bushing, while forming a space where the stator is inserted between the inner and outer rotors.

As described above, the present invention takes the merits of the double rotor type BLDC motor, and thus provides a motor where a stator core is perfectly divided. That is, the BLDC motor according to the present invention takes the merits of increasing the output and torque and removes the demerits of increasing the material cost caused by using a high-performance magnet material of the axial double rotor type motor, and takes the merits of causing the small axial vibration and removes the demerits such as the high investment of expensive molds, the coil winding cost caused by using an integrated single stator core, and the facility investment cost caused by using a dedicated winding machine.

Also, it is possible to automatically position and fix a number of stator core assemblies to a core support plate, to thereby easily mutually wire each coil and enhance productivity of assembling stators.

Also, the double rotors and the bushing are integrally molded by an insert molding method using thermosetting resin, to thereby enhance durability and reliability.

Also, the stator is integrally molded by using thermosetting resin, and then combined with the integrated double rotors, thereby providing a BLDC motor appropriate for driving a drum of a washing machine.

BRIEF DESCRIPTION OF THE DRAWINGS

The above and other objects and advantages of the present invention will become more apparent by describing the preferred embodiments thereof in more detail with reference to the accompanying drawings in which:

FIGS. 6A through 6D are views for explaining the structure and operational principle of a radial core type double rotor BLDC motor according to a basic embodiment of the present invention, in which FIG. 6A is a cross-sectional view schematically showing the BLDC motor cut along the circumferential direction, FIG. 6B is a plan view showing the BLDC motor cut along the axial direction, FIG. 6C is a perspective view showing a divided stator core, and FIG. 6D is a perspective view showing a bobbin;

FIGS. 13A through 13D are views showing a second embodiment of the present invention, in which FIG. 13A is an exploded perspective view showing a relationship of coupling a stator core assembly and a core support plate, FIG. 13B is an enlarged perspective view of the core support plate, FIG. 13C is an enlarged view showing a coupling state of the core support plate, and FIG. 13D is a cross-sectional view cut along line A-A of the division type stator core;

FIG. 19A is a cross-sectional view of an integrated double rotor motor seen in an axial direction.

BEST MODE FOR CARRYING OUT THE INVENTION

Preferred embodiments of the present invention will be described in detail with reference to the accompanying drawings.

The present invention provides a motor structure which can realize a division type core structure as a new motor of a double rotor structure in which an internal magnet type and an external magnet type are combined. When permanent rotors are disposed at both sides of a stator in an axial gap type double rotor BLDC motor, an output is enhanced and a magnetic circuit is formed. The present invention applies advantages of such an axial gap type double rotor BLDC motor to a radial core type double rotor BLDC motor.

Figure 4A:
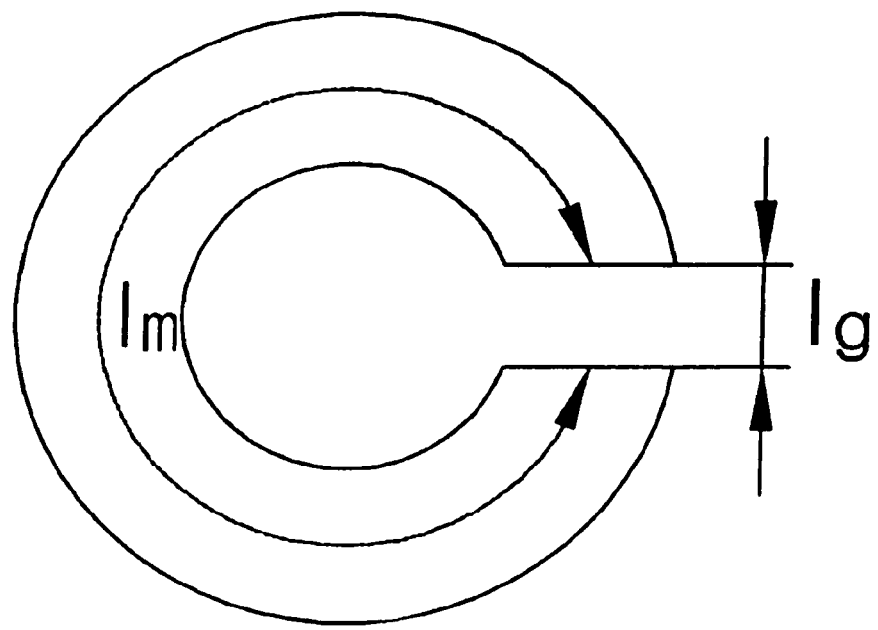
FIGS. 4A through 4C are views for explaining a toroidal permanent magnet having a gap.

Prior to describing the radial core type double rotor BLDC motor according to the present invention, an ideal magnetic circuit will be described. In FIG. 4A, a toroidal magnet has a gap $1g$. When the gap $1g$ is filled with an auxiliary magnetic material of a high permeability, it is assumed that the status of the magnet is positioned at a point "a" on a demagnetization curve of FIG. 4C. This position is a point having the highest magnetic flux density Bm at the state where an external magnetic field is not present, and a state having the lowest magnetic resistance.

Figure 4B:
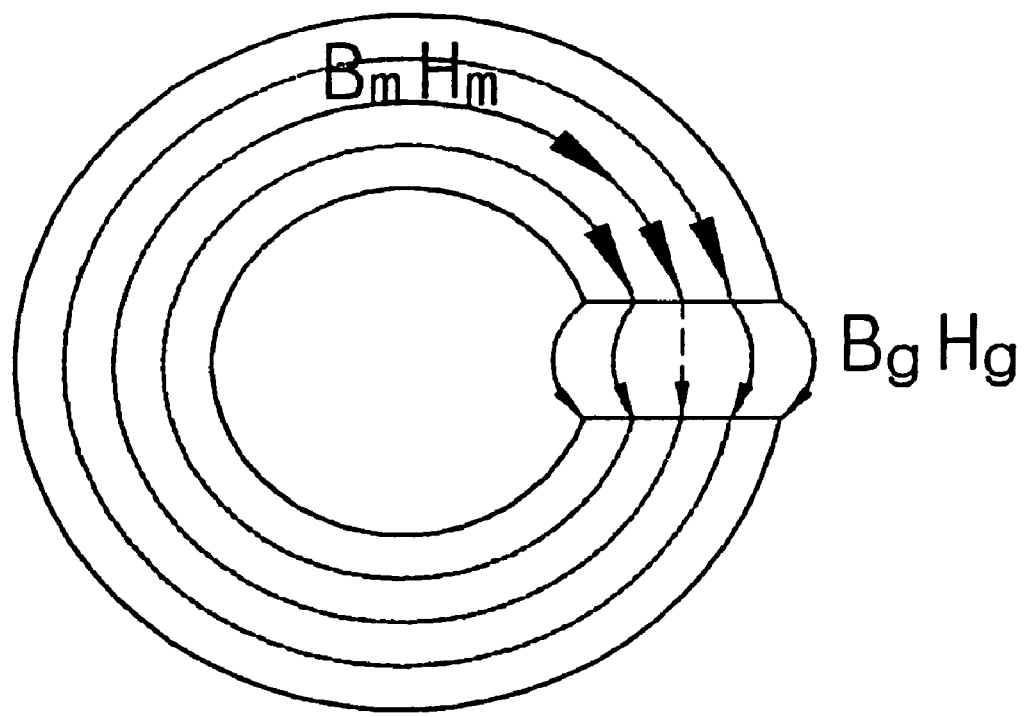
Figure 4C:
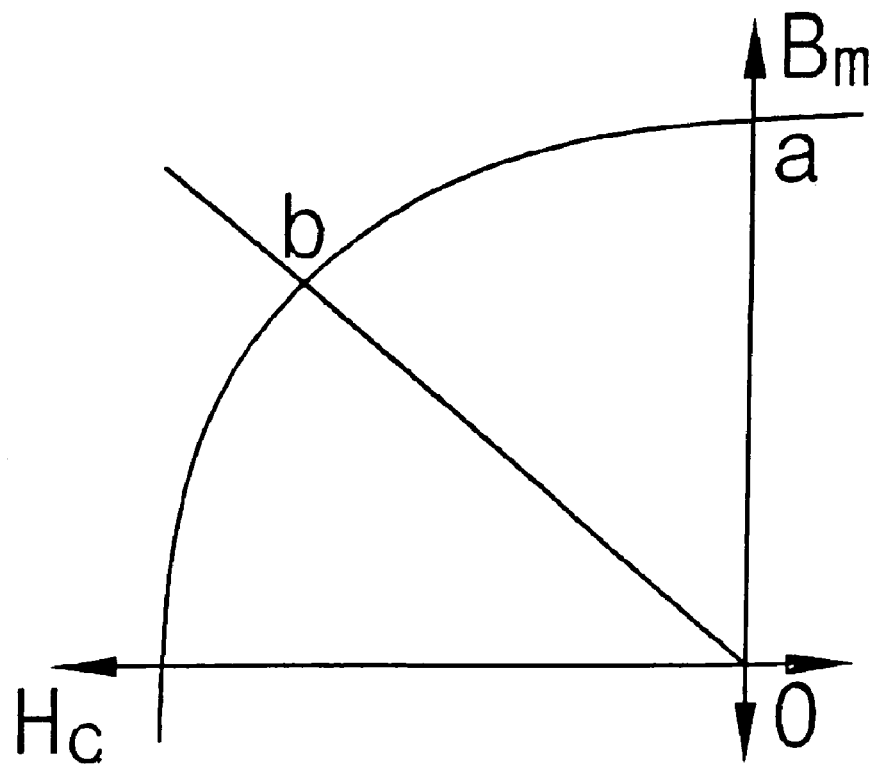

If the auxiliary magnetic material is removed from the gap, a magnetic resistance (reluctance) of the magnetic circuit is increased since permeability of air is lower than that of the auxiliary magnetic material, and the statue of the magnet moves to a point "b" on the FIG. 4C demagnetization curve. That is, a magnetic flux density Bm is decreased.

The magnetic flux is present only in the magnet except for a gap. The magnetic flux is uniformly distributed on the cross-section of the magnet. However, the magnetic flux is distributed with a little scattering in the gap as shown in FIG. 4B. Thus, it will be regarded that the cross-sectional area "Ag" of the gap is slightly larger than the cross-sectional area "Am" of the magnet.

When the ampere integration rule for the magnetic field is applied, the following Equation 1 is obtained since there is no free current. Equation 1 is rewritten into Equation 2. Hm.times.1 m+Hg.times.1 g=0 (1) Hm=−1 g 1 m.times.Hg.function.[A.times./.times.m] (2)

It can be seen through Equation 2 that presence of the gap induces an effect that a magnetic field of a direction opposing the magnetic flux advancing direction (that is, a demagnetization field) is applied in the permanent magnet. Here, signs of Hm and Hg are opposite to each other.

Since the magnetic flux must be continuous throughout the whole circuit, the following Equation 3 is established. Also, a relationship between the magnetic flux density and the magnetic field in a gap is expressed as Equation 4. Thus, Equation 5 can be obtained by Equations 1 through 4. Bm.times. Am=Bg.times.Ag.function.[Wb]
(3).times.Bg=.mu.0.times.Hg (4).times.Bm=−.mu.0.times. Ag Am 1 m 1 g.times.Hm.times.[T] (5)

Here, .mu..sub.0 denotes permeability of vacuum or air, and has a value of 4.pi..times.10.sup.−7 [N/A.sup.2] or 4.pi..times.10.sup.−7 [H/m] in the SI unit system, that is a coefficient representing a relationship between a magnetic field and a magnetic flux density distributed in the space. The permeability of ferromagnetic materials such as iron amounts about 5000.mu..sub.0. The magnetic resistance Rm is expressed as 1/.mu.S in which 1 denotes length of the magnetic circuit through which the magnetic flux passes, .mu. denotes permeability, and S denotes across-sectional area. Here, it can be seen that permeability is inversely proportional to the magnetic resistance.

Equation 5 represents a straight line (0, b) of FIG. 4C, in which an intersection "b" with the demagnetization curve represents a magnetic state where an auxiliary magnetic material has been removed (that is, an operating point). A value representing slope of the straight line is called a permeance coefficient.

Figure 5:
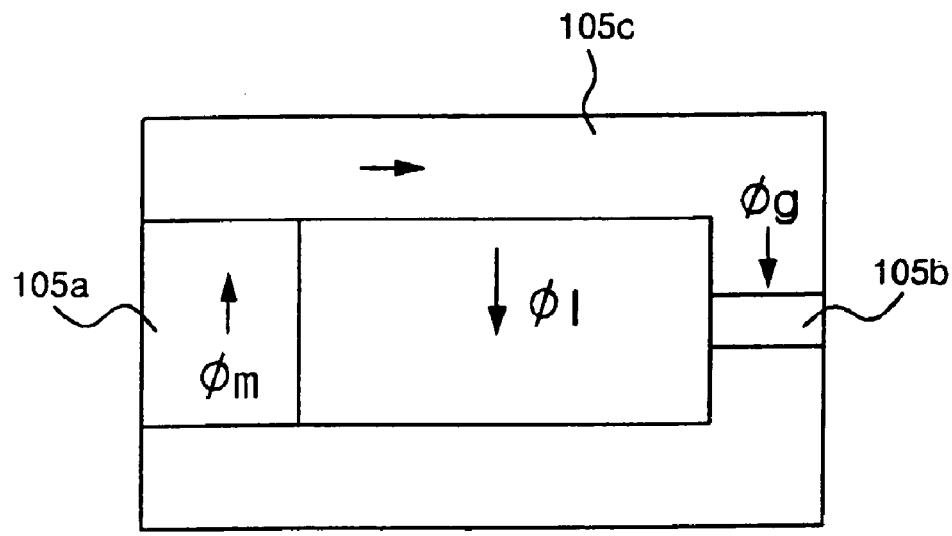
FIG. 5 is a view for explaining a conventional magnetic circuit.

By the above analysis, it can be seen that the operating point of a permanent magnet is determined by a shape of a magnet and a demagnetization curve. However, since the actual situation is far from the ideal case, a more realistic situation as shown in FIG. 5 can be considered.

A portion occupied by a magnet 105a in a magnetic circuit is very small. A path through which most magnetic fluxes pass, that is, a pole piece is made of a material of low magnetic resistance and high permeability. The magnetic circuit includes a gap in which an auxiliary magnetic material 105b is inserted. Thus, most fluxes .PHI. g among the whole magnetic flux .PHI. m generated by the magnet 105a passes through the pole piece 105c. If the auxiliary magnetic material 105b is removed, a small number of fluxes are leaked and do not pass through the gap. As a result, as shown in FIG. 5, leaking fluxes .PHI. l pass through the space formed between the upper and lower pole pieces 105c. To represent the above leaking situation, a leakage coefficient q must be included as expressed as Equation 6. B.sub.mA.sub.m=qB.sub.gA.sub.g [Wb] (6)

The leakage coefficient q is defined as (flux in a magnet)/ (flux in a gap). A relationship between Bm and Hm is defined as Equation 7. Bm=−.mu.0.times.q.times..times. Ag.times.1 m Am.times.1 g Hm.function. [T] (7)

The following facts can be seen from the above-described Equations.

A status of a permanent magnet, that is, an operating point is determined by a demagnetization feature that is an inherent feature of a magnet, size of the magnet, and construction of a magnetic circuit.

If other conditions are same, a magnetic flux density at an operating point becomes large as a magnet is magnetized in a lengthy direction and an area of a surface perpendicular to the magnetization direction becomes small.

When a portion of a large magnetic resistance is present in part of a magnetic circuit, a magnetic flux density is decreased. When length of a gap becomes wide, the magnetic flux density is decreased.

As a magnetic resistance in a magnetic circuit becomes large, a magnetic flux density is decreased, and a magnetic field Hm of a counter-direction with respect to the magnetic flux in the magnet that is called a demagnetization field becomes large.

Thus, the present invention provides a BLDC motor having merits of easy manufacturing, easy winding, and small loss of materials, based on the above-described principle, in which the BLDC motor is manufactured by dividing a stator core instead of forming a magnetic circuit by disposing permanent magnet rotors at the inner and outer sides of a stator.

Hereinbelow, first of all, the structure and operational principle of a motor according to the present invention will be described, and embodiments of manufacturing a stator will be described. Then, the most preferable embodiment of a commercialized motor according to the present invention, a stator structure and various manufacturing methods thereof will be described.

Figure 6A:
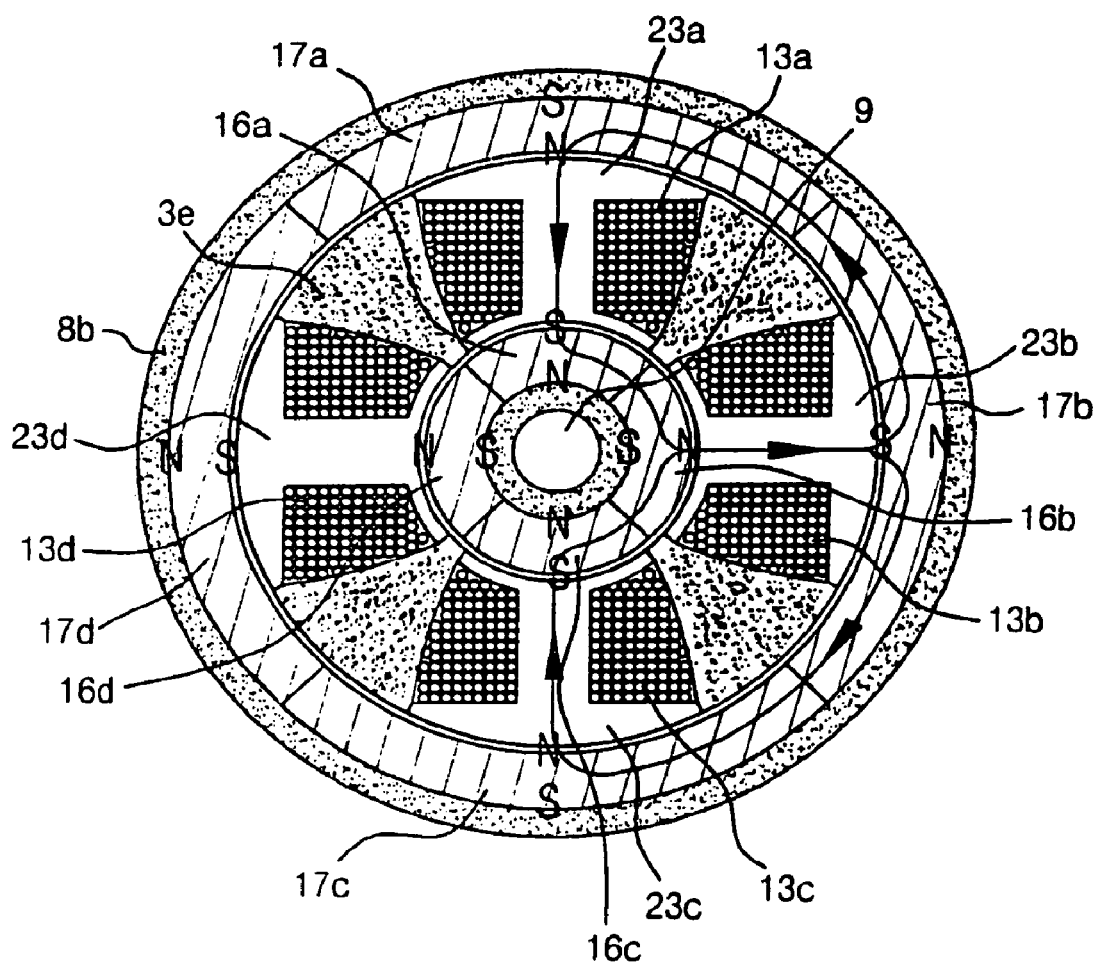
Figure 6B:
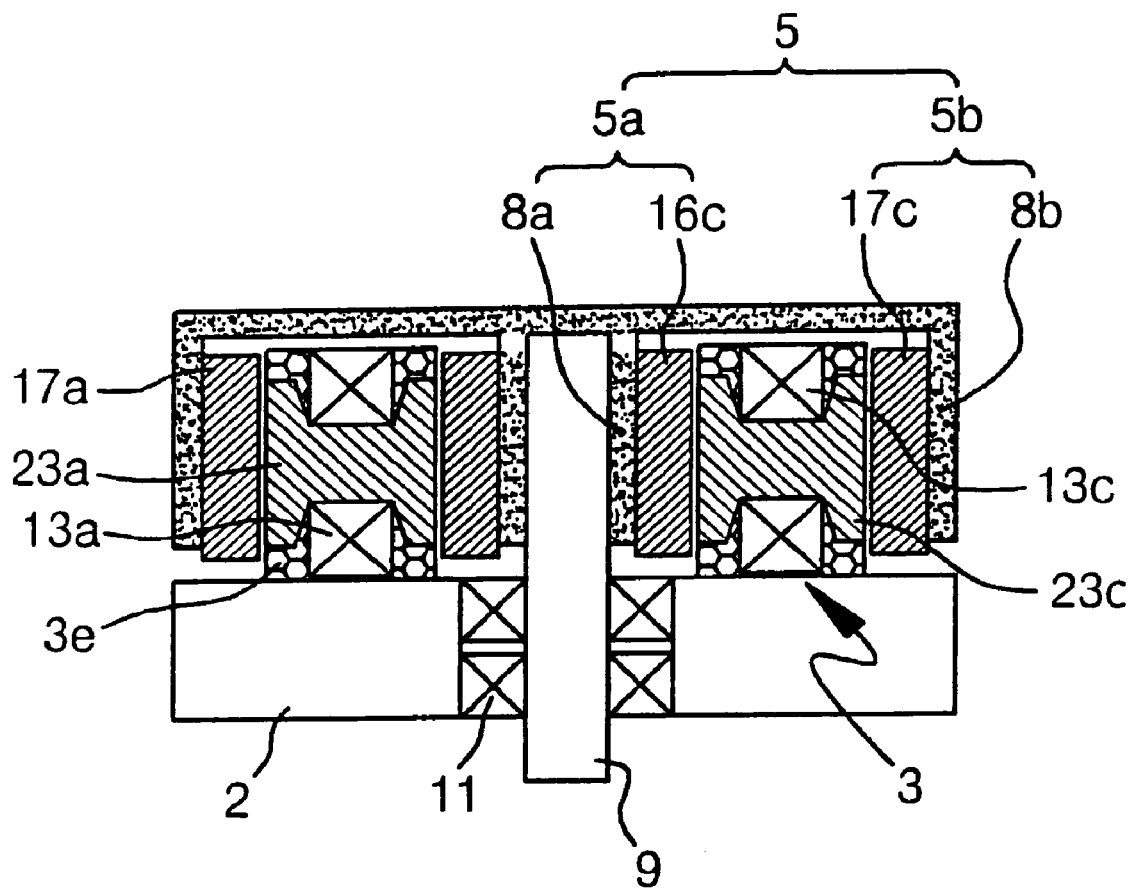
Figure 6C:
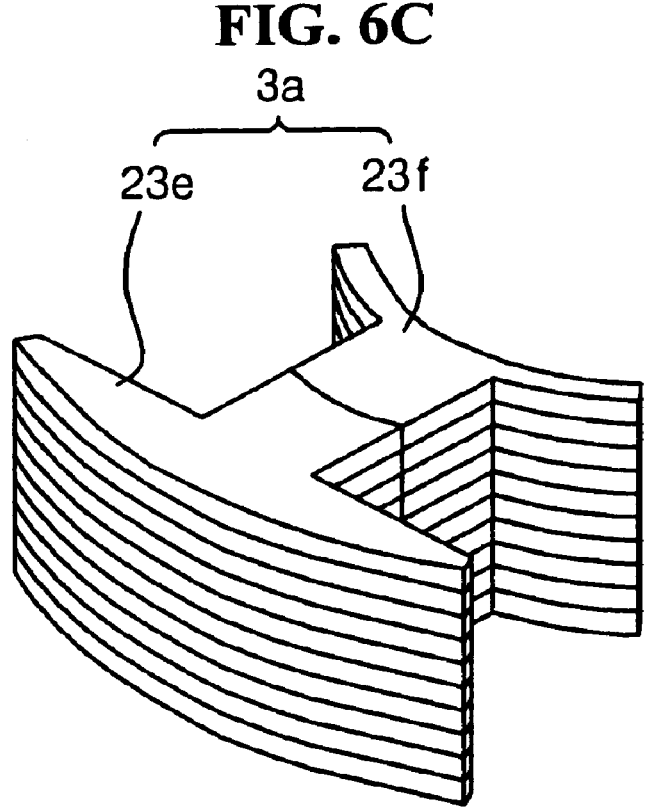
Figure 7A:
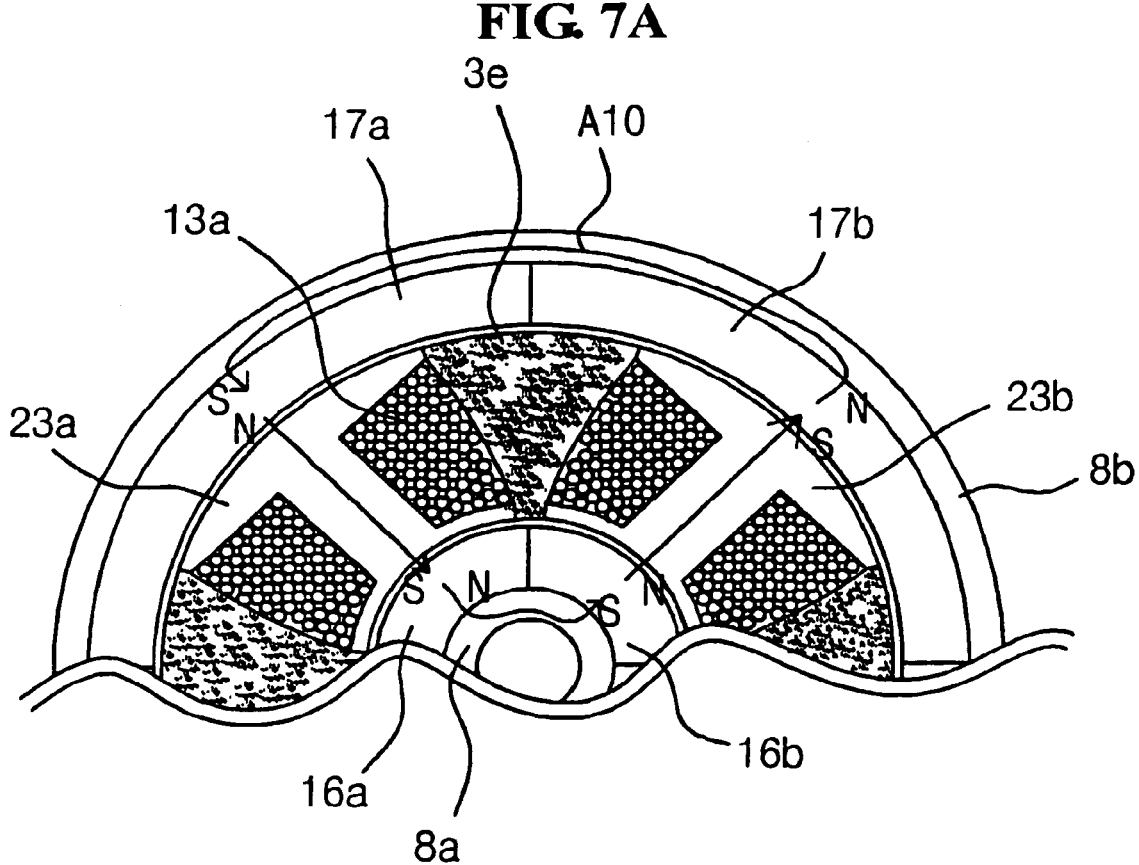
FIGS. 7A and 7B are plan views for comparing a magnetic circuit according to the present invention with that of the existing external magnet radial core type motor.
Figure 7B:
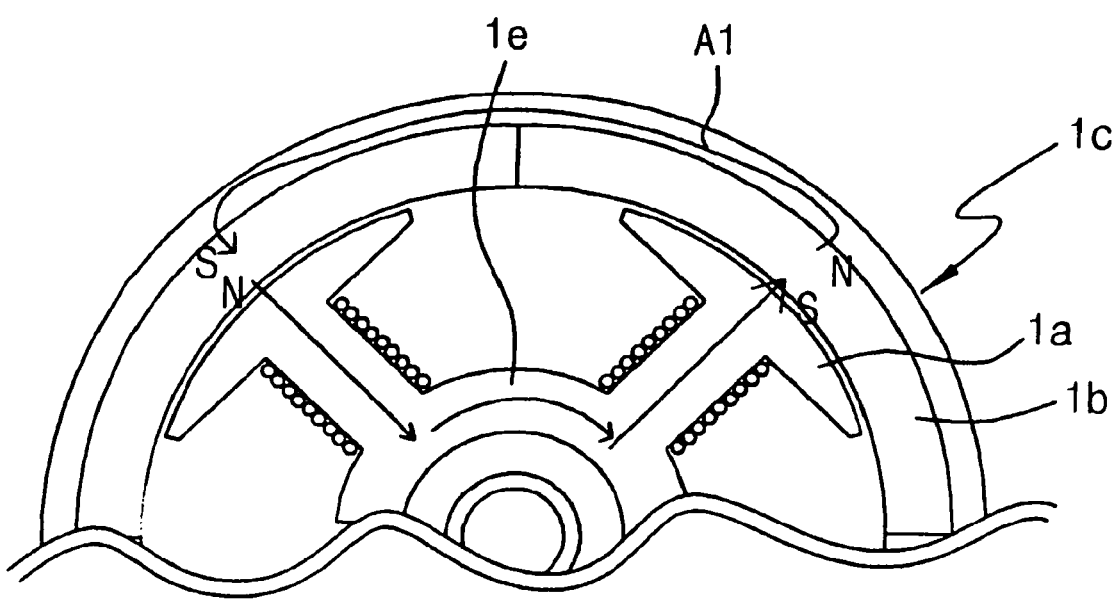

FIGS. 6A through 6C are views for explaining the structure and operational principle of a radial core type double rotor BLDC motor according to the present invention, in which FIG. 6A is a cross-sectional view schematically showing the BLDC motor, FIG. 6B is a plan view showing the BLDC motor, and FIG. 6C is a perspective view showing a single stator core. FIGS. 7A and 7B are plan views for comparing a magnetic circuit according to the present invention with that of the existing radial core type motor.

Referring to FIGS. 6A through 6C, in a radial core type double rotor BLDC motor according to the present invention, a pair of double rotors 5 including an inner rotor 5a and an outer rotor 5b are combined with a stator support frame, for example, a rotational shaft 9 that is rotatably supported to the center of a housing through two bearings preferably in the housing 2 in the body of the motor, and an integrated annular stator 3 is disposed between the double rotors 5.

An annular inner yoke frame 8a and an annular outer yoke frame 8b are preferably integrally formed in the double rotors 5, and supported to the rotational shaft 9. A number of magnets 16a-16d and 17a-17d are divisionally magnetized on the opposing surface of the inner yoke frame 8a and the outer yoke frame 8b, or a number of divided magnets are mounted thereon. A number of opposing magnets 16a-16d and 17a-17d positioned in the facing surface of the inner yoke frame 8a and the outer yoke frame 8b, are disposed to have different polarities. Simultaneously, adjacent opposing magnets are disposed to have different polarities.

Also, a predetermined gap is formed between the opposing magnets in the double rotors. A number of division type stator cores 3a (23a-23d) are disposed in the annularly disposed stator 3. A coil 3b (13a-13d) is individually wound around each division type stator core 23a-23d. The number of division type stator cores 23a-23d are fixed by stator support materials 3e that is injection-molded in thermosetting resin to accomplish a fixed annular shape.

As shown in FIG. 6C, the division type stator cores 23a-23d are made of a number of silicon steel plates laying a silicon steel plate over another, or by sintering a soft magnetic compound having high permeance and high electrical resistance, in order to prevent loss of a magnetic flux due to eddy current that can occur during rotation of a motor. In this case, the shape of the core can be made more freely.

Figure 1:
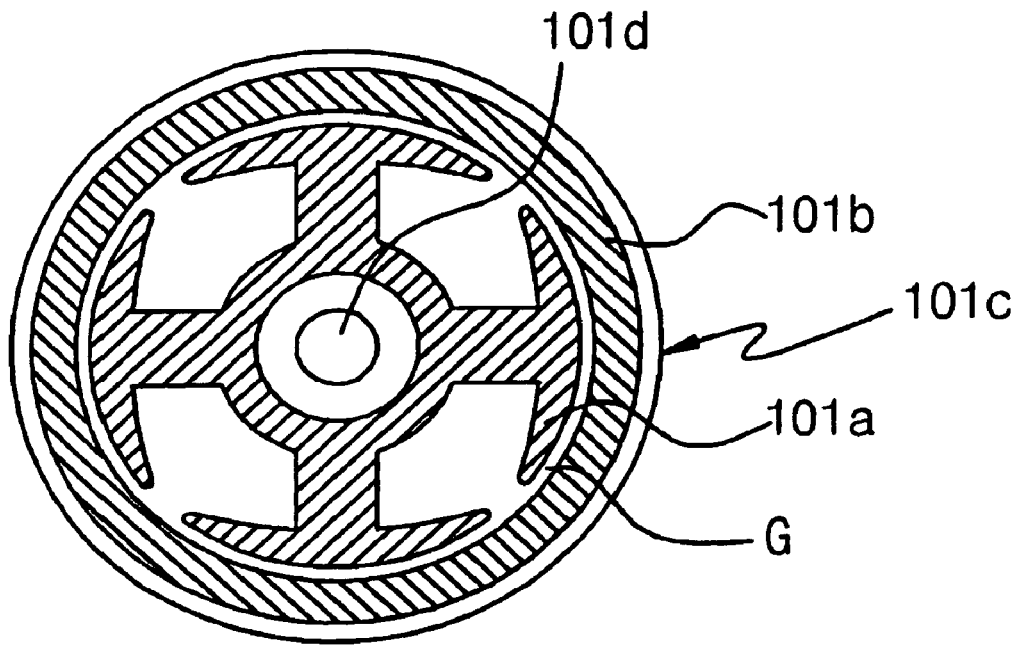
FIG. 1 is a cross-sectional view for explaining a structure of a conventional external magnet core type BLDC motor.
Figure 2:
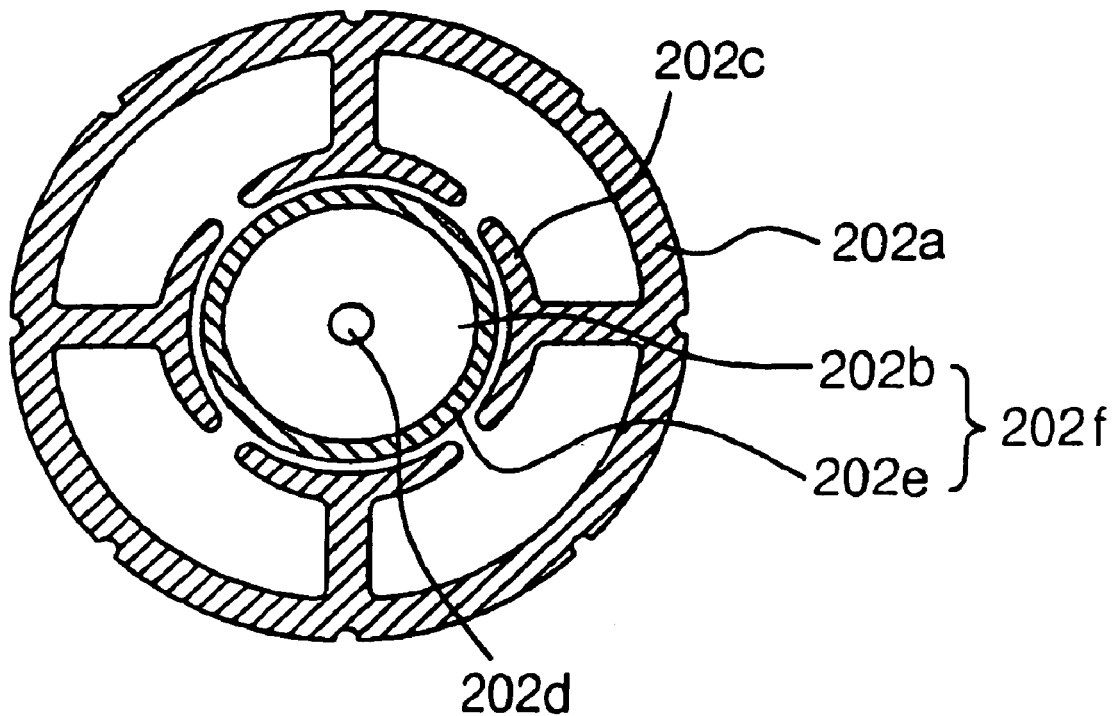
FIG. 2 is a cross-sectional view for explaining a structure of a conventional internal magnet core type BLDC motor.
Figure 3:
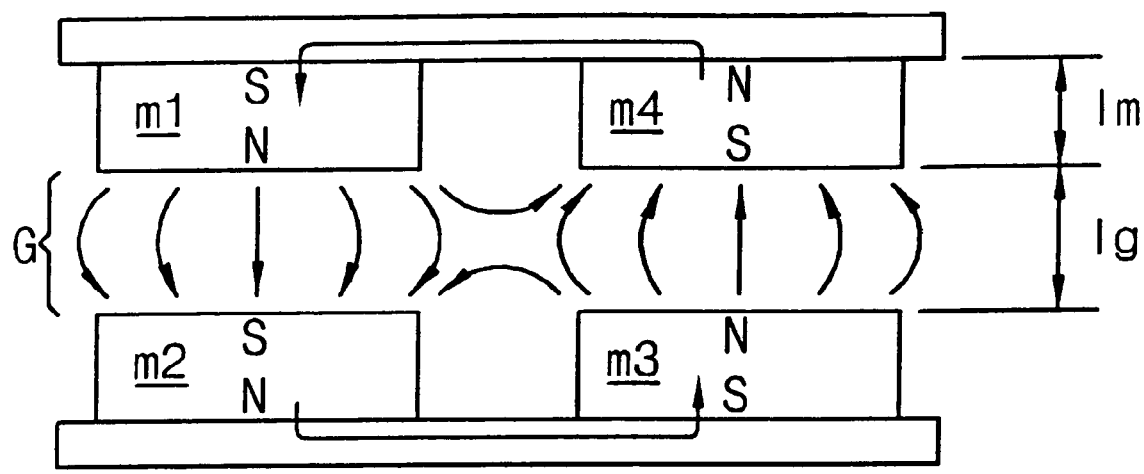
FIG. 3 is a view for explaining a conventional axial gap type magnetic circuit.

Prior to describing the function of the radial core type double rotor BLDC motor having the above-described structure according to the present invention, a magnetic circuit in an external magnet type motor among the conventional radial core type motors as shown in FIG. 1 will be described with reference to FIG. 7B. When power is applied to coils in a motor of an integrated core structure, a magnetic field is formed in the coils wound around a stator core 1a, to thus make a rotor casing rotate by an interaction with the magnetic flux generated from a permanent magnet 1b installed in the rotor 1c.

Here, in the case of the integrated core type motor as shown, a salient pole and another salient pole 1e in a core portion of a low magnetic resistance must be connected to each other and formed integrally, in order to maintain a flow of a magnetic path along an arrow direction A1 formed to pass through the integrated stator core 1a, the magnet 1b and the yoke in the rotor.

Thus, since coils are wound around a T-shaped core portion in the integrated core type motor, by using a dedicated winding machine, a manufacturing cost and an installation cost become high to thus weaken the competitiveness. Also, since a core shape is complicated and large in the conventional integrated radial core type motor, a material loss becomes large and a winding work becomes difficult.

Meanwhile, as shown in FIG. 7A, a divided core type motor according to the present invention forms a magnetic circuit along an arrow direction A10 in sequence with a magnet 16a, an inner yoke frame 8a, a magnet 16b, and a stator core 23b in an inner rotor 5a, and a magnet 17b, an outer yoke frame 8b, a magnet 17a, and a stator core 23a in an outer rotor 5b.

That is, since the permanent magnets 16a-16d and the yoke frame 8a in the inner rotor 5a play a role of salient poles in the integrated core type motor, the stator core 3a need not be of an integrated type. Thus, the present invention enables the stator core to be fabricated with a number of individual cores 23a-23d.

As a result, since a division type core is small, a loss of silicon steel plate is small. Thus, since a material loss for the division type core is little, and a shape of the division type core is simplified, it can be easily fabricated. Also, since coils can be wound around the divided cores 23a-23d by using a general purpose winding machine, an investment cost for winding coils and purchasing a winding machine is reduced.

As shown in FIG. 6C, a stator fabrication method according to the present invention includes the steps of molding an I-shaped stator core 3a by using a silicon steel plate, and separating the molded I-shaped stator core 3a into upper and lower portions to then be stacked into two T-shaped cores 23e and 23f, or separating a soft magnetic powder sintered product into upper and lower portions and fabricating a division type core 3a.

Figure 6D:
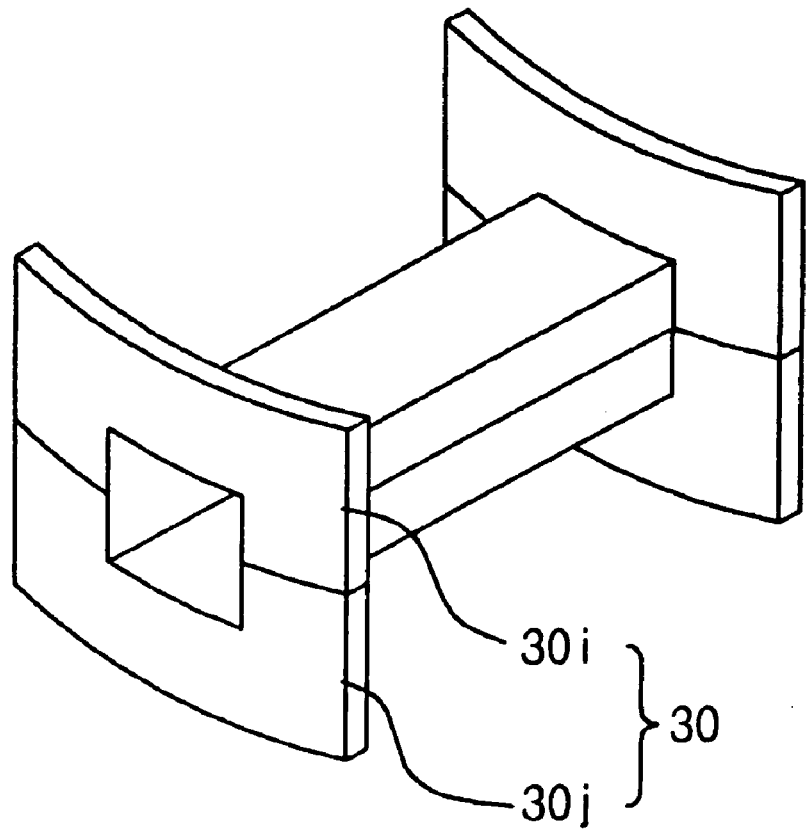

Thereafter, as shown in FIG. 6D, coils are wound around an insulator bobbin 30 by a general transformer manufacturing method. Then, one separated part 23e of a T-shaped core is inserted into one side of the bobbin 30 and the other separated part 23f of the T-shaped core is inserted into the other side of the bobbin 30. These two parts of the T-shaped core are bonded by a caulking process, to complete a stator core assembly around which coils are wound. Then, the stator core assemblies around which a number of coils have been wound are disposed and fixed on a PCB and the coils are wired. Thereafter, at the state where the PCB on which the stator core assemblies have been disposed in annular form into a mold (not shown), thermosetting resin is injected by an injection molding method such as an insert molding method, to thereby obtain an annular integrated stator according to the present invention.

Another method of manufacturing a stator according to the present invention will be described below with reference to FIG. 8.

First, division type stator cores 24a-24h are fabricated in the T-shaped form. Then, as shown in FIG. 6D, coils 13a-13d are wound around a number of insulator bobbins 30. Then, the separated T-shaped cores 24a, 24c, 24e and 24g are inserted into the bobbins 30 from upwards, and the separated T-shaped cores 24b, 24d, 24f and 24h are inserted into the bobbins 30 from downwards, to thus complete a stator core assembly around which a number of coils have been wound.

Then, in the same manner as the above-described embodiment, the stator core assemblies around which a number of coils have been wound are disposed and fixed on a PCB or a core support and the coils are wired. Thereafter, at the state where the PCB on which the stator core assemblies have been disposed in annular form into a mold (not shown), thermosetting resin is injected by an injection molding method such as an insert molding method, to thereby obtain an annular integrated stator similar to the above-described embodiment according to the present invention.

Figure 8:
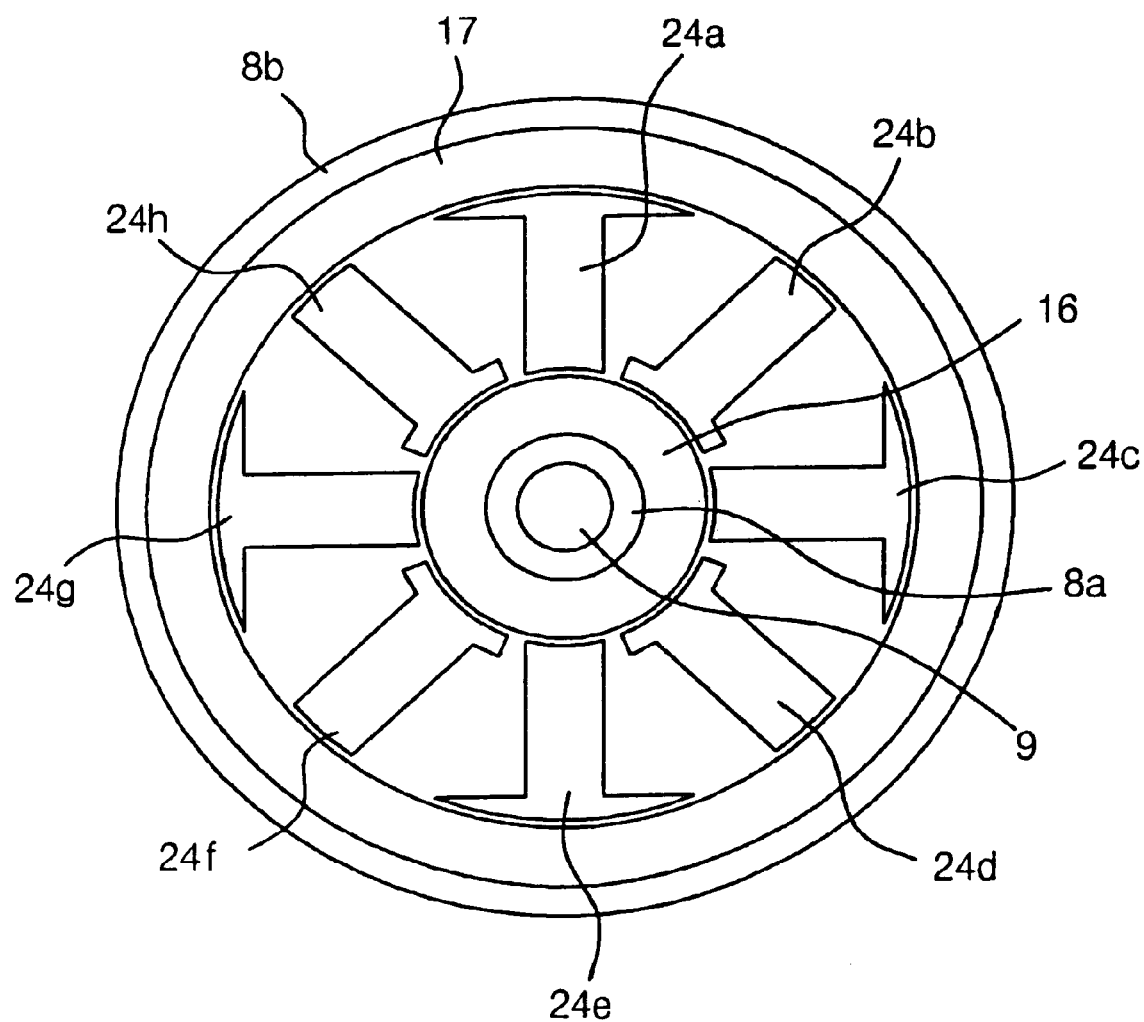
FIG. 8 is a plan view showing a core arrangement when a shape of a division type core is of a T-shape according to a variation of the present invention.

In FIG. 8, the bobbin 30, the coils 3b wound around the bobbin 30, and the stator support 3e formed of resin have been omitted in order to illustrate a core structure of the stator cores 24a-24h.

As still another stator manufacturing method, an I-shaped integrated core is fabricated as shown in FIG. 6C, and then the bobbin which has been divided into upper and lower bobbins 30i and 30j as shown in FIG. 6D. Thereafter, the divided bobbins 30i and 30j are assembled into the I-shaped core 3a, and then coils 3b are wound around the assembled bobbins 30i and 30j, to thereby prepare a number of stator core assemblies around which the coils have been wound.

Then, in the same manner as the above-described embodiment, the stator core assemblies around which a number of coils have been wound are disposed and fixed on a PCB and the coils are wired. Thereafter, at the state where the PCB on which the stator core assemblies have been disposed in annular form into a mold (not shown), thermosetting resin is injected by an injection molding method such as an insert molding method, to thereby obtain an annular integrated stator similar to the above-described embodiment according to the present invention.

As described above, although the bobbin applied in the above-described embodiments has been described as having a divided structure, a number of bobbins can be of an annular form to then make both ends thereof connected to each other.

Thereafter, a rotational shaft 9 and an integrated double rotor 5 are combined with the completed integrated stator 3, to thereby complete a radial core type double rotor BLDC motor of a divided core structure.

Hereinbelow, a commercialized BLDC motor according to a preferred embodiment of the present invention will be described.

Figure 9A:
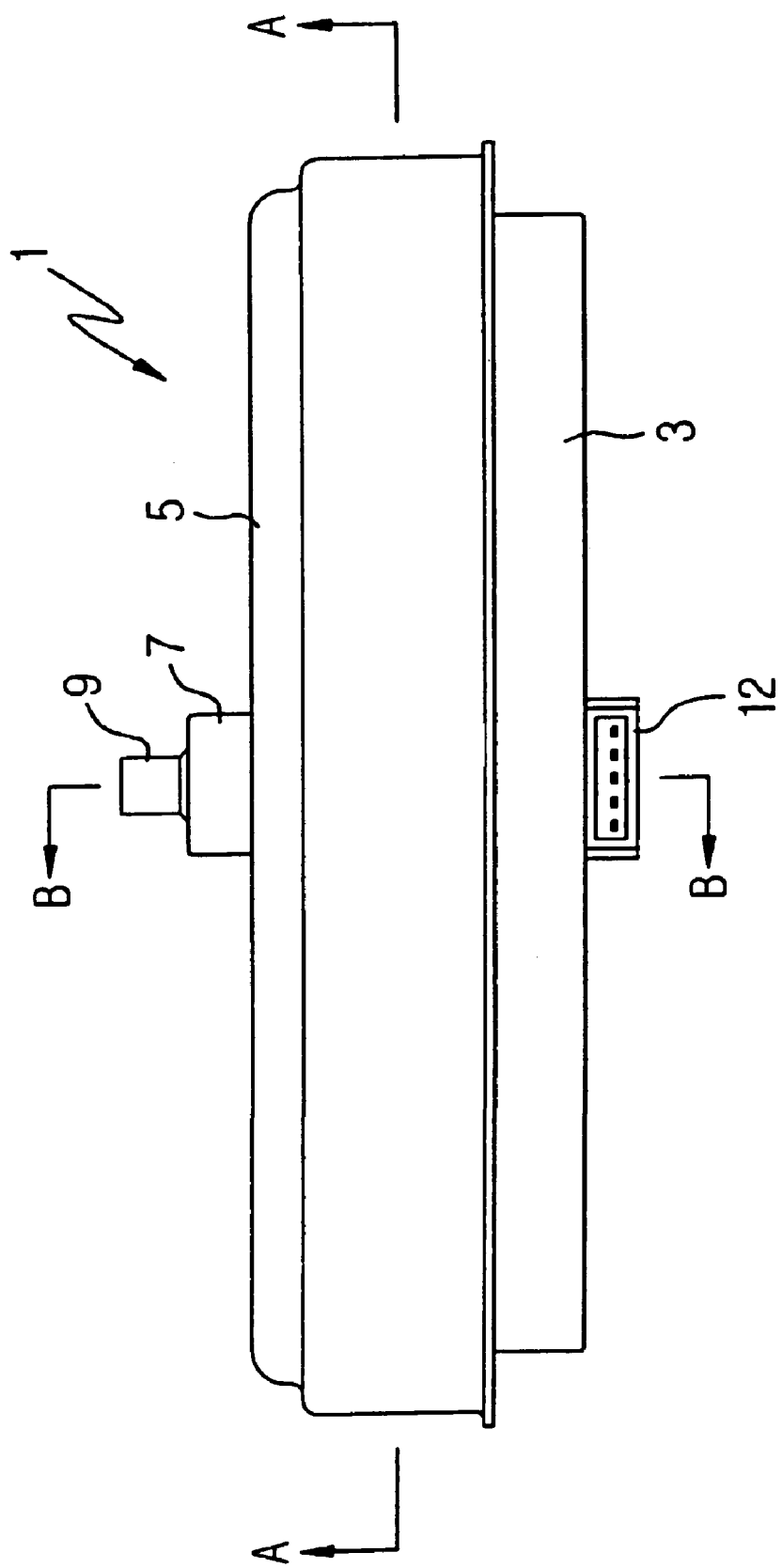
FIG. 9A is a front view of a radial core type double rotor BLDC motor according to a preferred embodiment of the present invention.
Figure 9B:
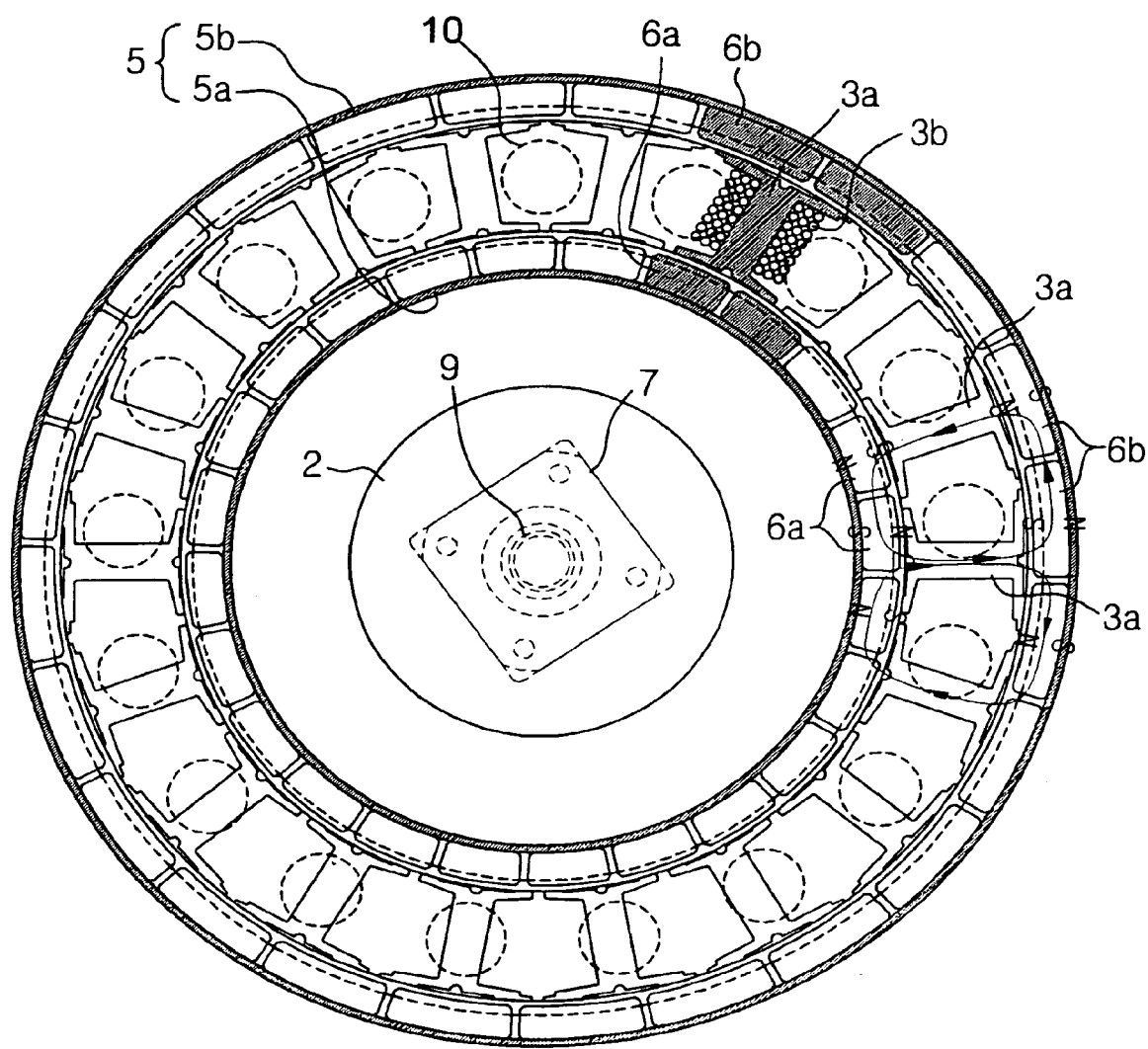
FIG. 9B is a cross-sectional view cut along line A-A of FIG. 9A.
Figure 9C:
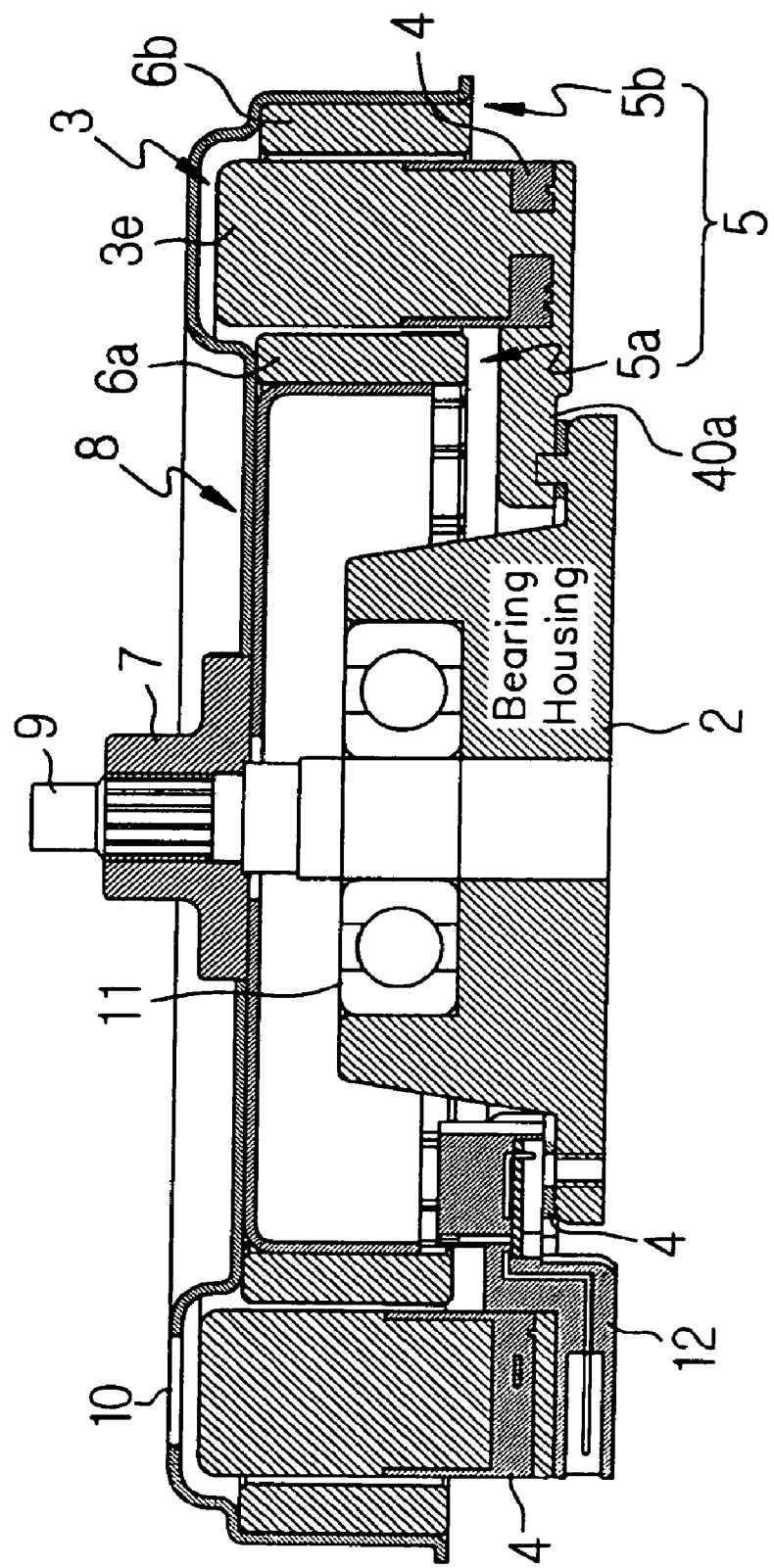
FIG. 9C is a cross-sectional view cut along line B-B of FIG. 9A.

FIG. 9A is a front view of a radial core type double rotor BLDC motor according to a preferred embodiment of the present invention. FIG. 9B is a cross-sectional view cut along line A-A of FIG. 9A. FIG. 9C is a cross-sectional view cut along line B-B of FIG. 9A.

Referring to FIGS. 9A to 9C, the BLDC motor is installed on the lower portion of a washing machine and has a structure appropriate for driving the drum of the washing machine in the left and right directions, but is not limited thereto.

That is, in the case of the BLDC motor 1 shown in FIG. 9C, the inner circumferential portion of a core support plate 4 is supported on a housing 2 of the washing machine by a variety of coupling elements such as a bolt/nut. The BLDC motor 1 includes a stator 3 where a number of completely divided stator cores 3a are assembled in annular form in which coils 3b are wound around the outer circumference of a bobbin (not shown), a rotor 5 of a double rotor structure where a number of magnets 6a and 6b are disposed in annular form with a predetermined magnetic gap on the inner and outer circumferences of the stator 3 and an inner rotor 5a and an outer rotor 5b are supported to a yoke frame 8, and a rotational shaft 9 which is rotatably supported to the housing 2 via a bearing 11 and connected to the center of the yoke frame 8 via a bushing 7.

The stator 3 is integrally formed of thermosetting resin in annular form by an insert molding method, at the state of temporarily assembling a number of stator core assemblies 3c of FIG. 11C in which coils 3b are wound around the outer circumference of a bobbin (not shown) with an annular core support plate 4 including an automatic position setting/supporting unit, which will be described later.

In this case, the stator support 3e formed by the insert molding method for the number of stator core assemblies is inserted between the number of stator core assemblies to integrate the number of stator core assemblies 3c. An extension 40a which is extended inwards from the core support plate 4 at the time of performing the insert molding method plays a role of fixing the housing 2 of the washing machine and simultaneously blocking water leaked from the washing machine from flowing into the motor.

Also, the core support plate 4 includes a variety of automatic position setting/supporting units to be described later. Accordingly, when a number of stator core assemblies 3c are assembled on the core support plate 4, an assembly position is automatically determined and simultaneously easily temporarily assembled for an insert molding method, to thereby enhance an assembly workability.

In FIG. 9C, a reference numeral 12 denotes a Hall IC assembly for generating a position signal detecting position of a rotor 5 rotating in order to control a current supply for a 3-phase driving type stator coil. Accordingly, as shown in FIGS. 9C and 19A, an inner yoke 51a in an inner yoke frame 8a in the inner rotor 5a is not extended to the lower end of the inner magnet 6a and a portion opposing the Hall IC in the Hall IC assembly 12 has been removed.

A reference numeral 10 denotes a cooling hole.

Since the rotor 5 of the double rotor structure is rotated by the stator 3 in the motor 1 in the same manner as that of the FIG. 6 embodiment, the detailed description thereof will be omitted.

That is, since the magnets 6a and 6b of the inner rotor 5a and the outer rotor 5b and the division type stator core 3a form a single complete magnetic circuit, it is possible to completely divide a stator core. Thus, the present invention can divide a stator core into a number of division type stator cores 3a, and also increase a motor output and torque by employing a double rotor.

However, when a stator core is divided into a number of division type stator cores 3a, a coil winding productivity for an individual stator core 3a is remarkably superior to the case of using an integrated, that is, single stator core, but an assembly productivity thereof and a durability thereof can be inferior thereto.

Hereinbelow, a structure of enhancing an assembly productivity and a durability of the assembled product of a radial core type double rotor BLDC motor 1 according to the present invention will be described in detail.

Figure 10A:
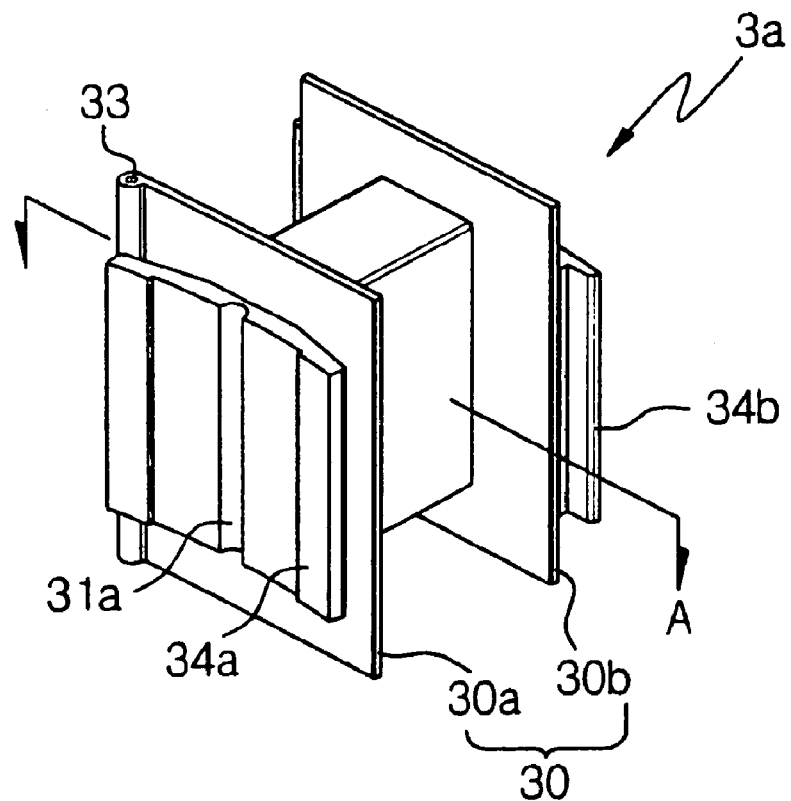
FIG. 10A is a perspective view of a perfect division type stator core which is used in the present invention.
Figure 10B:
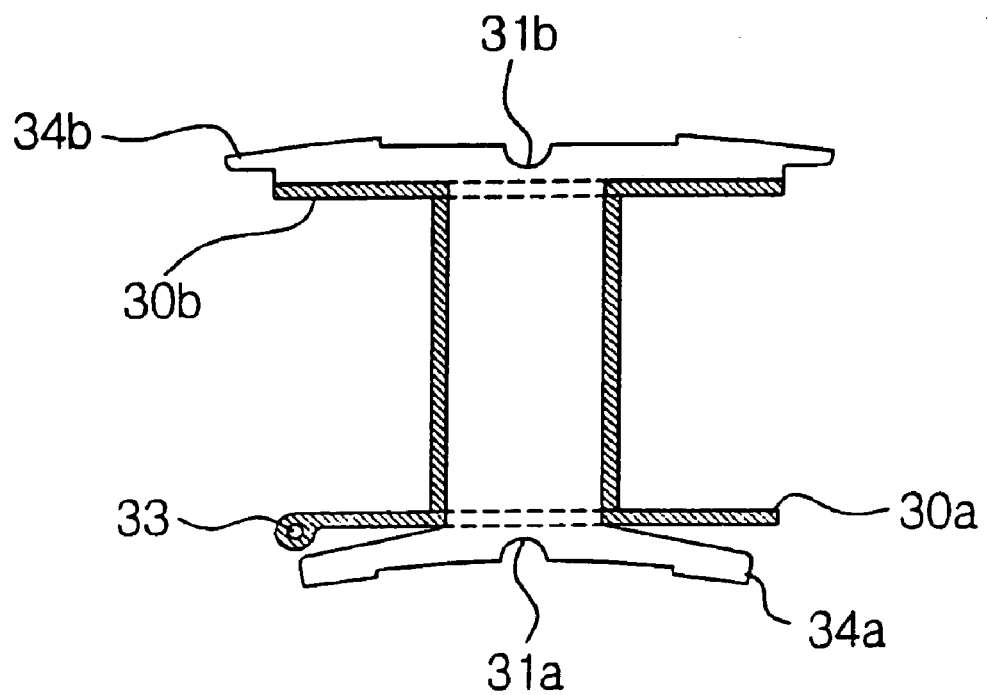
FIG. 10B is a cross-sectional view cut along line A-A of FIG. 10A.
Figure 11A:
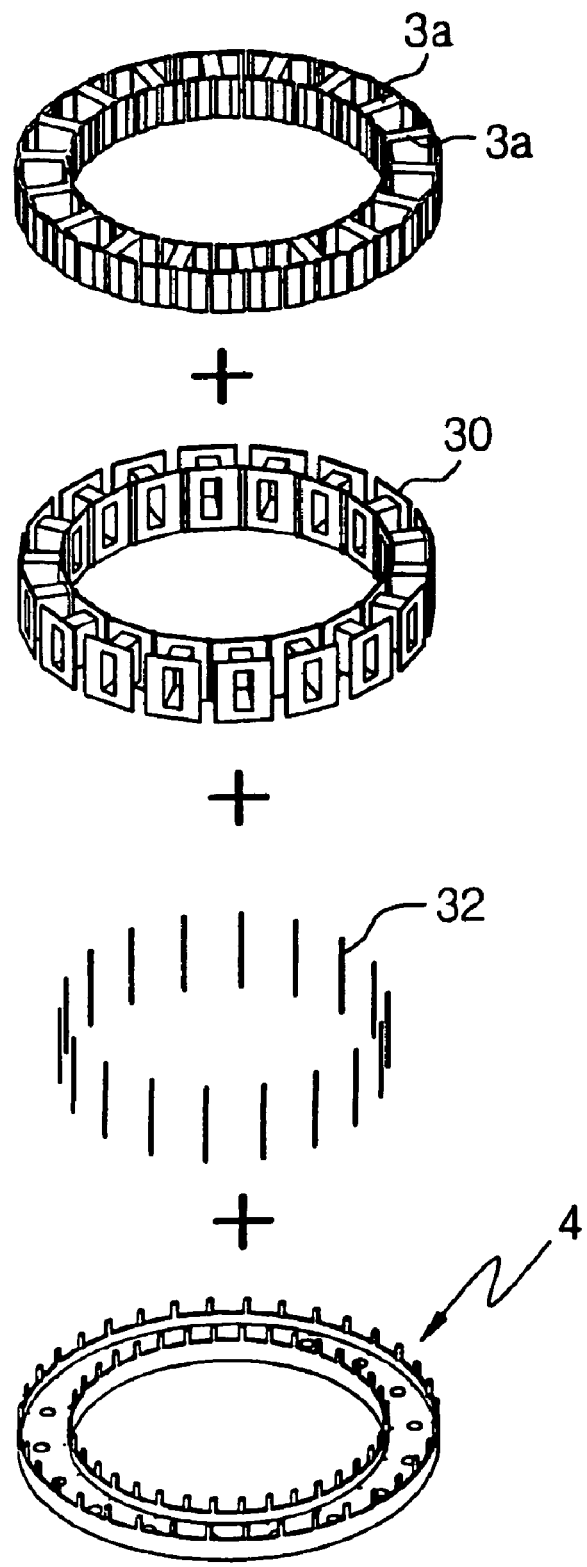
FIG. 11A is an exploded perspective view showing a relationship of coupling a stator core assembly and a core support plate according to a first embodiment of the present invention.
Figure 11B:
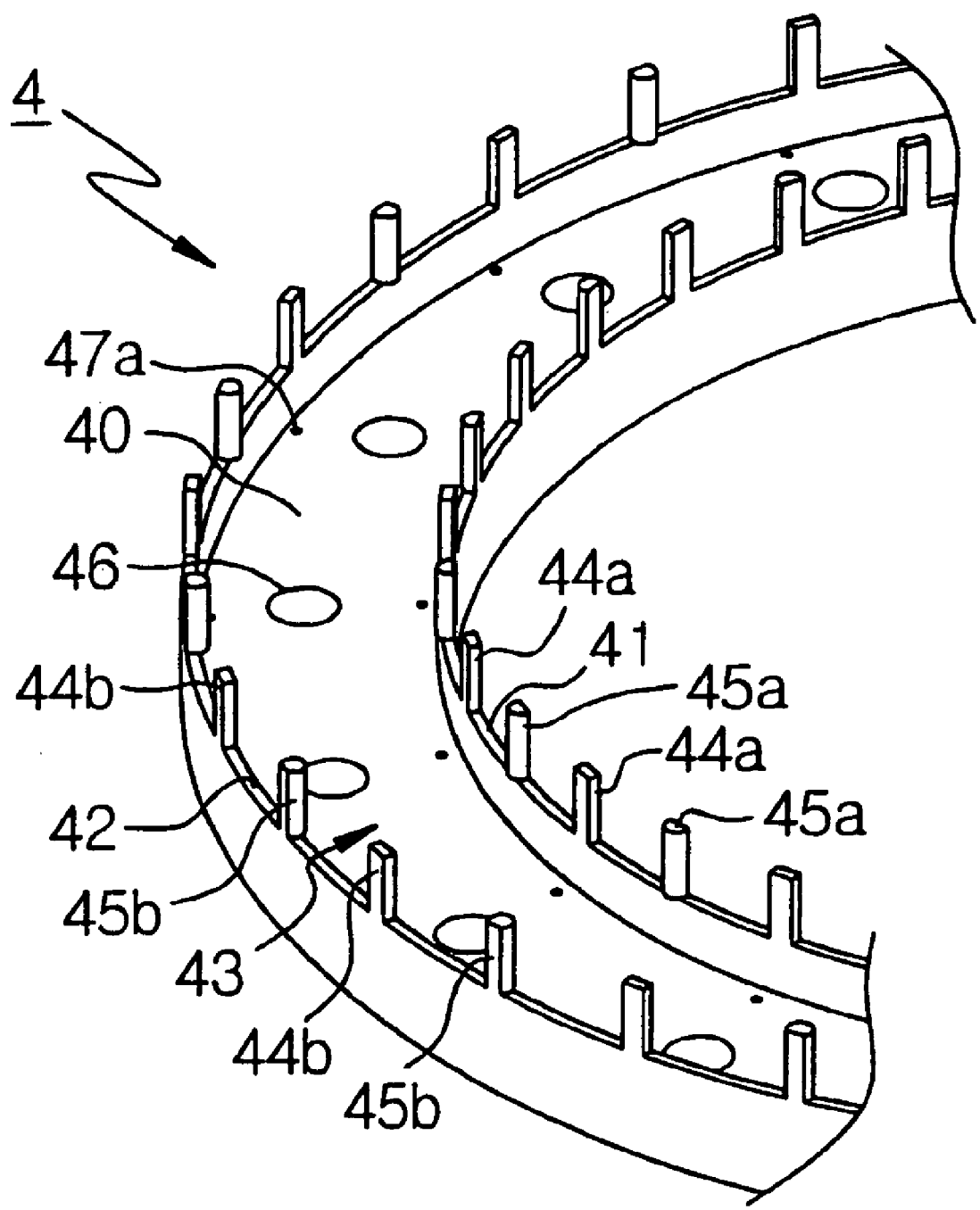
FIG. 11B is a partially enlarged perspective view of a core support plate.

FIG. 10A is a perspective view of a perfect division type stator core which is used in the present invention. FIG. 10B is a cross-sectional view cut along line A-A of FIG. 10A. FIG. 11A is an exploded perspective view showing a relationship of coupling a stator core assembly and a core support plate according to a first embodiment of the present invention. FIG. 11B is a partially enlarged perspective view of a core support plate. FIG. 11C is an enlarged view showing a coupling state of the core support plate.

As shown in FIGS. 10A and 10B, a division type stator core 3a is formed of a substantially I-shaped form. As shown, coupling grooves 31a and 31b whose sectional areas are of shapes of a semi-circle are vertically formed at opposing positions on both side surfaces. A bobbin 30 made of an insulation material such as a plastic material is combined on the outer circumferences of the side surfaces. A hollow vessel is formed in the middle portion of the bobbin 30, and flanges 30a and 30b are extended on the inner and outer sides of the vessel portion, respectively. A space in which coils 3b are wound is formed between the flanges 30a and 30b.

Also, the bobbin 30 is injection-molded with a general plastic material. In the present invention, connection pins 32 are inserted between the individual stator core assemblies for mutual connection of the wound coils 3b by phase (see FIG. 11C), or throughholes 33 through which coils pass can be formed at one side, both sides, or crossed position of the inner flange 30a in the bobbin.

In this case, it is preferable that an assembly between the I-shaped stator core 3a and the bobbin 30 is integrally molded by an insert molding method using thermosetting resin. However, the present invention is not limited thereto but can be assembled in the well-known method.

Also, the inner and outer flanges 30a and 30b is formed of a relatively smaller area than the outer opposing surface of the inner and outer extensions 34a and 34b in the I-shaped stator core 3a. In particular, the lower ends of the inner and outer extensions 34a and 34b in the stator core 3a are distant by a predetermined distance from the lower ends of the inner and outer flanges 30a and 30b, respectively. The exposed portions which are not covered with the inner and outer extensions 34a and 34b of the stator core 3a in the inner and outer flanges 30a and 30b are accommodated and supported by inner and outer guide flanges 41 and 42 in the core support plate to be described later.

Figure 11C:
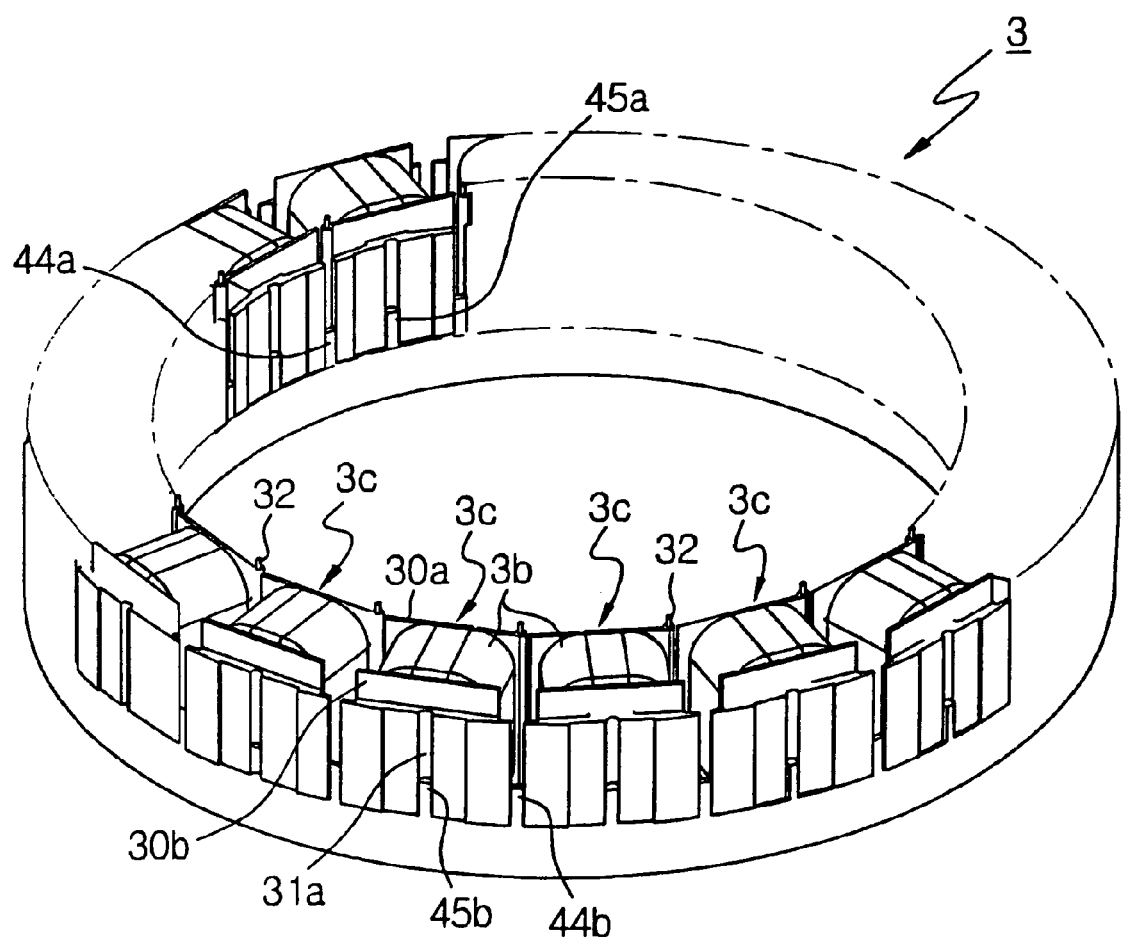
FIG. 11C is an enlarged view showing a coupling state of the core support plate.

Meanwhile, a number of stator core assemblies 3c shown in FIG. 11C are assembled in the present invention and an annular core support plate 4 is used as shown in FIG. 11B in order to mutually wire both ends of the coils 3b. The core support plate 4 has a structure that a pair of inner and outer guide flanges 41 and 42 are vertically extended from an annular plate 40 toward one lateral direction of the inner and outer sides of the annular plate 40, that is, upwards, to thus accommodate and support the lower portion of the individual stator core 3a. That is, the exposed portions which are not covered by the inner and outer extensions 34a and 34b of the stator core 3a in the inner and outer flanges 30a and 30b of the bobbin 30 are accommodated and supported in a space 43 between the inner and outer guide flanges 41 and 42.

Further, in order to automatically determine an assembly position and simultaneously maintain a support state when a number of stator core assemblies 3c are assembled in the upper ends of the inner and outer guide flanges 41 and 42, a number of first coupling protrusions 44a and 44b whose cross-sections are rectangular and a number of second coupling protrusions 45a and 45a whose cross-sections are semi-circular are extended at a predetermined interval in the inner and outer guide flanges 41 and 42. In this case, the first and second coupling protrusions 44a and 45a in the inner guide flange 41 are opposed to the first and second coupling protrusions 44b and 45b in the outer guide flange 42, respectively.

Thus, as shown in FIG. 11C, in each of the number of stator core assemblies 3c, the second coupling protrusions 45a and 45b are combined with the coupling grooves 31a and 31b whose cross-sections are semi-circular in the stator core 3a, and the first coupling protrusions 44a and 44b are combined between the adjacent stator core assemblies 3c.

As a result, in the case that a number of stator core assemblies 3c are assembled by using the core support plate 4, the assembly positions in the radial direction and circumferential direction of the stator core assemblies 3c are automatically determined by the first coupling protrusions 44a and 44b and the second coupling protrusions 45a and 45b. Thus, an unskilled labor can assemble the number of stator core assemblies with the core support plate 4. At the same time, since a support state for an insert molding method can be easily maintained at the following steps, an assembly productivity is very excellent.

Also, since the inner and outer extensions 34a and 34b in the stator core 3a form the inward and outward curved surface with a predetermined curvature, respectively, in the temporarily assembled stator 3d, a fullness of a circle combined with the inner and outer circumferences of the stator core assemblies 3c becomes high, and thus a predetermined close magnetic gap can be maintained between the inner rotor 5a and the outer rotor 5b which are combined with the inner and outer portions of the stator 3d.

A reference numeral 46 in FIG. 11B denotes throughholes for fixing the stator core assemblies 3c to the core support plate 40 in which the stator support body 3e made of thermosetting resin communicates the upper and lower portions of the core support plate 40 and integrally formed during performing an insert molding method as shown in FIG. 9C. A reference numeral 47 denotes pin connection holes through which connection pins 32 are combined to mutually connect the coils 3b.

Figure 12A:
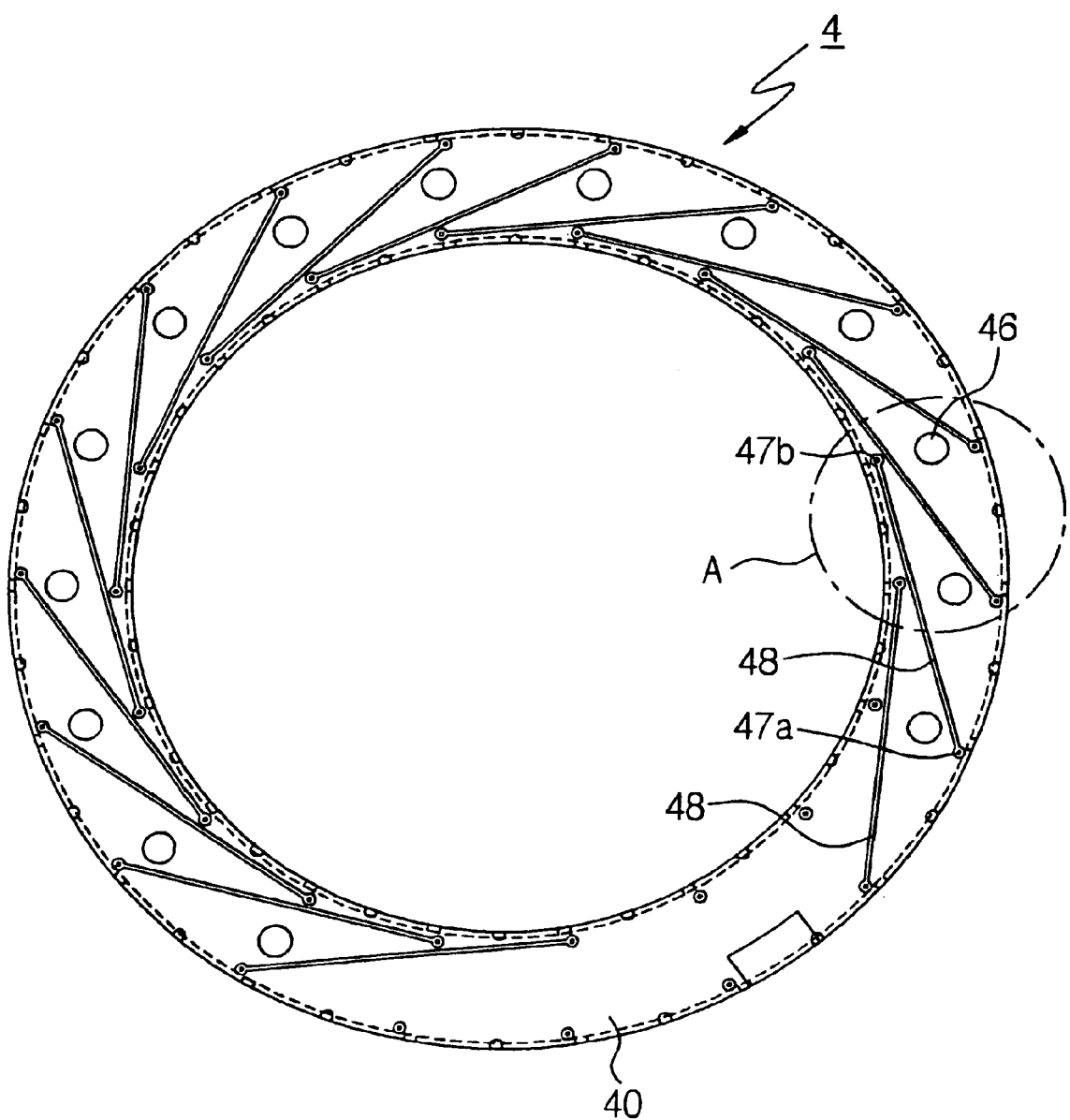
FIG. 12A is a bottom view of the core support plate of FIG. 11A.
Figure 12B:
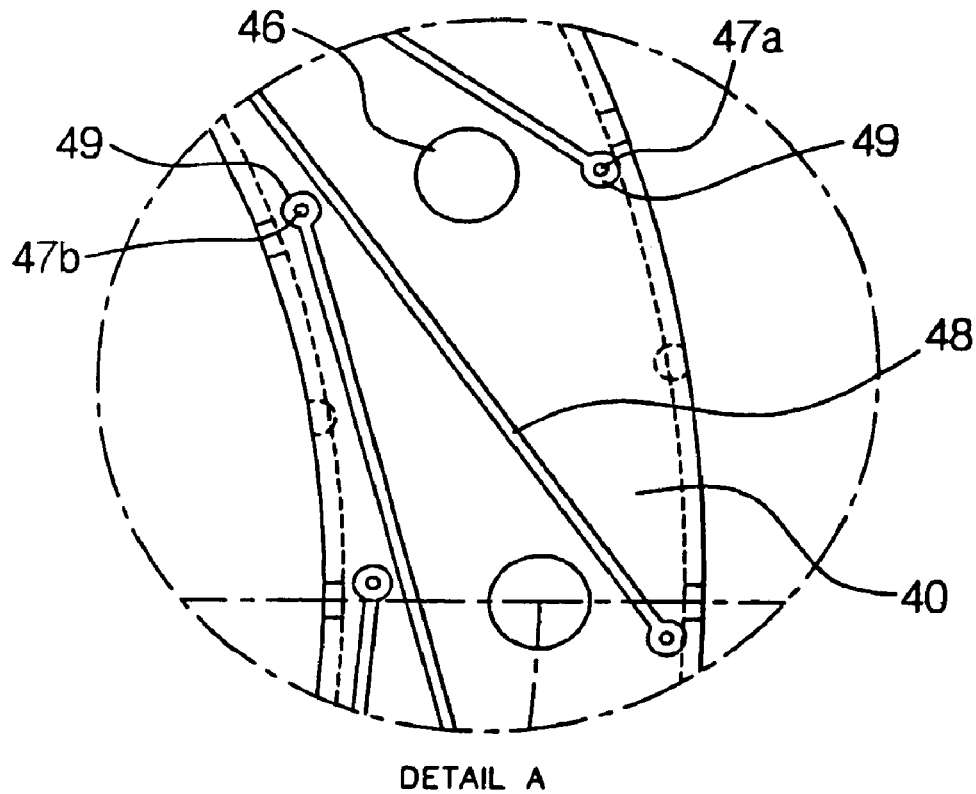
FIG. 12B is an enlarged view of portion "A" in the core support plate of FIG. 12A.

Meanwhile, in the case that a number of stator core assemblies 3c are assembled by using the cores support plate 4, a number of conductive lines 48 are disposed slantly on the bottom surface of the core support plate 4 as shown in FIGS. 12A and 12B, from the pin connection holes 47a which are disposed on the outer circumference to the pin connection holes 47b which are disposed on the inner circumference via the adjacent pin connection hole, in order to connect both ends of the coils 3b by each phase. In this case, a number of conductive lines 48 are formed of a structure contained in the recessed grooves, respectively (see FIG. 12C). The pin connection holes 47a and 47b are installed to penetrate the center of circular connection pads 49 which are disposed at both ends of the conductive lines 48. However, it is possible only to form a coil guidance recessed groove instead of the conductive lines.

FIGS. 12C through 12F are cross-sectional views showing a mutual wiring structure between the coils.

Figure 12C:
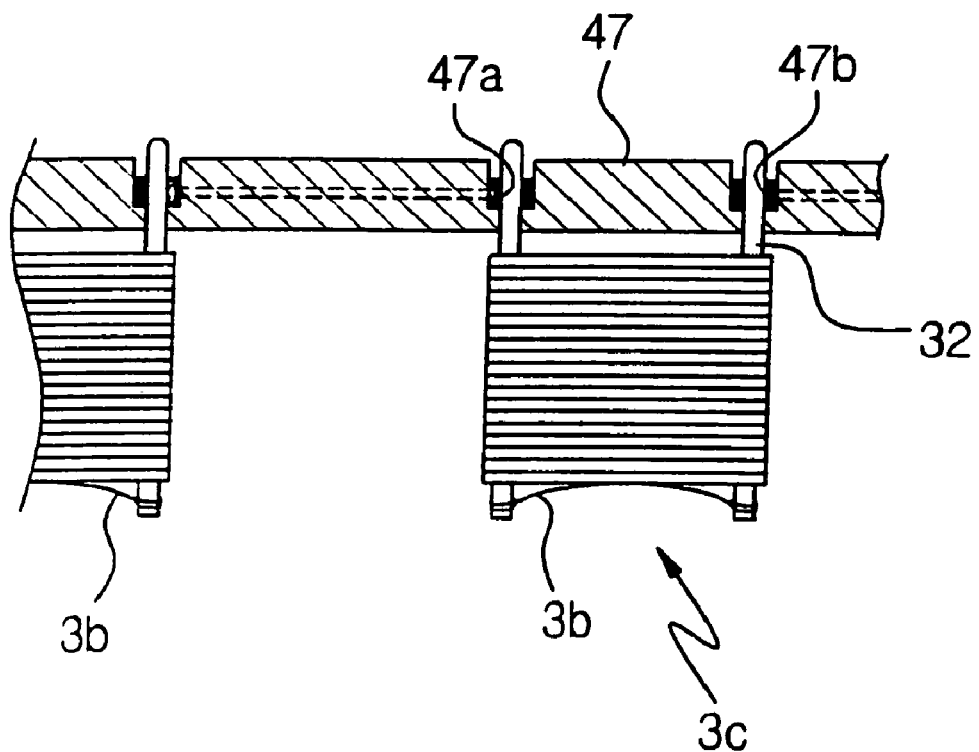
FIGS. 12C through 12F are cross-sectional views showing a mutual wiring structure between the coils.

As shown in FIG. 12C, in the case of a first coil wiring method between the coils 3b, a pair of connection pins 32 are integrally inserted into the bobbin 30 in the stator core assemblies 3c by an insert molding method. In this case, one end and the other end of the coils 3b are connected to the lower end of the connection pin 32 in advance. Then, the connection pins 32 in the stator core assemblies 3c are inserted and assembled into the pin connection holes 47a an 47b in the core support plate 4, and the conductive lines 48 formed on the bottom surface of the core support plate and the connection pins 32 are fixed by soldering, to thus connect coils 3b.

Figure 12D:
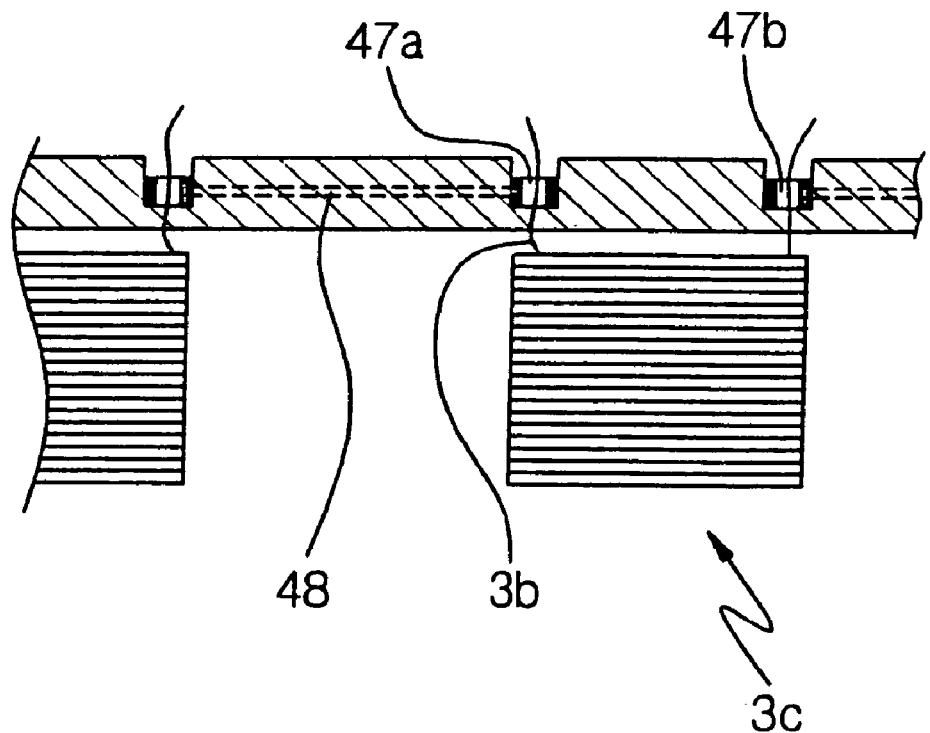

As shown in FIG. 12D, in the case of a second coil wiring method, one end of the coils in the stator core assemblies 3c is passed through the throughholes 33 formed in the flange 30a in the bobbin and inserted into the pin connection holes 47a and 47b in the core support plate 4. Each end of the coils and the conductive lines 48 are fixed by soldering, to thus connect the coils 3b.

Figure 12E:
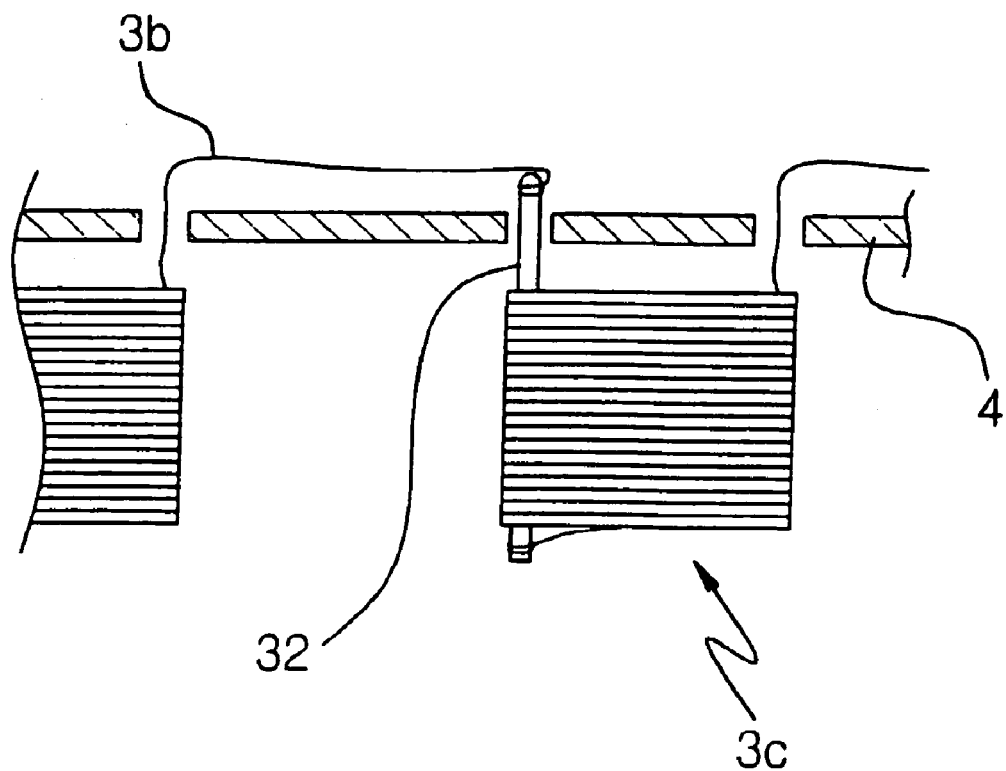

As shown in FIG. 12E, in the case of a third coil wiring method, one connection pin 32 is integrally inserted into the bobbin 30 in the stator core assemblies 3c, by an insert molding method, and one end of the coils 3b is connected to the lower end of the connection pins 32 in advance.

Thereafter, the connection pins 32 in the stator core assemblies 3c are inserted and assembled into the pin connection holes 47a in the core support plate 4, one end of the coils is passed through the throughholes 33 formed in the flange 30a in the bobbin and inserted into the pin connection holes 47b and 47b in the core support plate 4. The coils are wound around the connection pins 32, along the coil guidance recessed groove, and wired with each other, to thus connect the coils 3b.

Figure 12F:
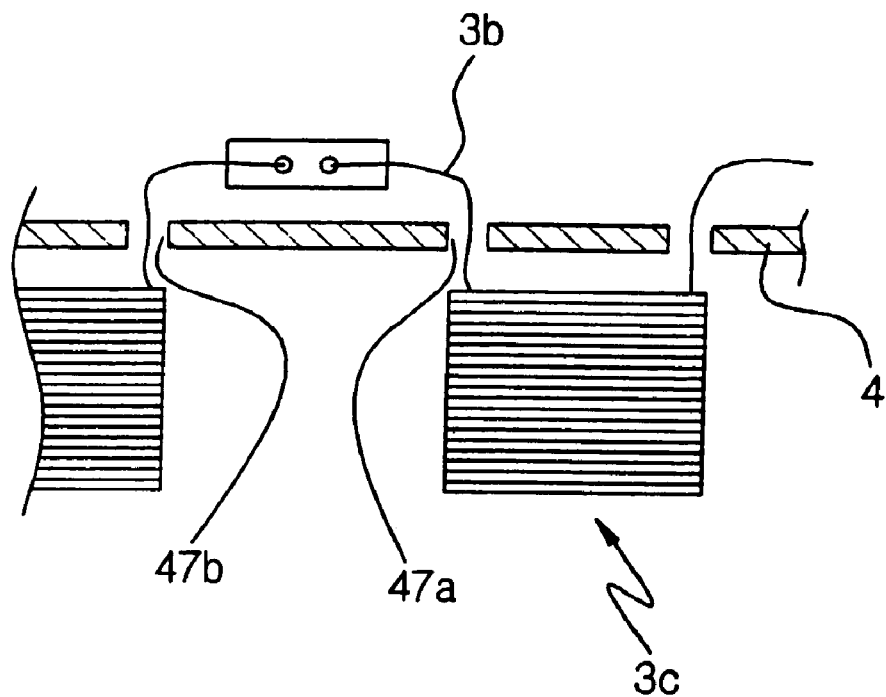

As shown in FIG. 12F, in the case of a fourth coil wiring method, both ends of the coils in the stator core assemblies 3c is passed through the throughholes 33 formed in the flange 30a in the bobbin and inserted into the pin connection holes 47a and 47b in the core support plate 4. Both ends of the coils are fixed by soldering, to thus connect the coils 3b.

As described above, since the present invention performs a coil wiring between the stator core assemblies 3c by passing through the pin connection holes 47a and 47b in the core support plate 4 and by soldering at the other end as shown in FIGS. 12C to 12F, a winding portion and a wiring portion on the core are separated to thus enhance an insulation performance.

Also, a number of conductive lines 48 formed on the bottom surface of the core support plate 4 and the corresponding wiring guidance recessed grooves or printed wiring guidance lines are disposed by phase along the positions of the coils to be wired. Thus, a person solders the connection pins 32 or coils 3b having passed through the pin connection holes 47a and 47b to the end of the conductive lines 48 (see FIGS. 12C and 12E). Otherwise, when coils are wired along the guidance recessed grooves or printed wiring lines, any worker can easily wire the coils and the conductive lines 48.

Hereinbelow, an assembly process of the stator 3 according to a first embodiment of the present invention will be described.

First, each stator core 3a is inserted into a hollow vessel of the bobbin 30, and integrally molded by an insert molding method so that at least one connection pin 32 is inserted into the corner portion of the flanges 30a and 30b in the bobbin.

Thereafter, coils 3b are wound around the outer circumferences of the flanges 30a and 30b in the bobbin 30 which is integrally molded with the stator core 3a, by using a general-purpose winding machine, to thereby prepare a number of stator core assemblies 3c.

Then, a number of stator core assemblies 3c are combined on the upper portion of the core support plate 4 which has been injection-molded as shown in FIG. 11A, and both ends of the coils are wired by phase on the bottom surface of the core support plate 4 according to the coil wiring method, to thus obtain the stator 3d as shown in FIG. 11C.

Meanwhile, when the temporarily assembled stator 3d of FIG. 11C is used as a driving motor for a washing machine, the intensity thereof is weak to endure a magnetic force generated during running a washing machine. Also, in order to consistently maintain an air gap between the inner and outer magnets and the core, it is necessary to assume a concentricity.

Figure 15:
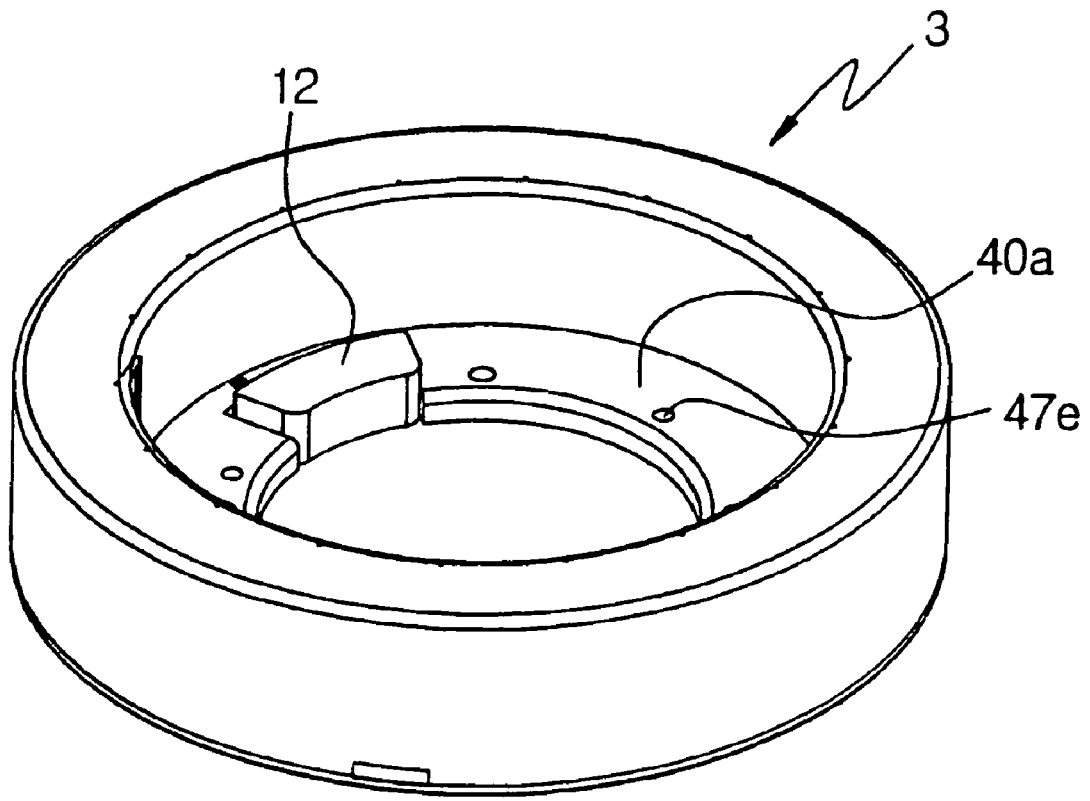
FIG. 15 is a perspective view showing an integrated stator according to the present invention.

For this purpose, except for the outer opposing surfaces of the inner and outer extensions 34a and 34b in each stator core 3a, the lower surface of the stator core 3a is molded with thermosetting resin, for example, BMC (Bulk Molding Compound) such as polyester, so that a space between a number of stator core assemblies 3c and a coil wiring portion in the lower portion of the core support plate 4 are covered, to thereby obtain a stator 3 shown in FIGS. 9C and 15. In this case, the extension 40a connected with the stator support 3e located in the lower portion of the core support plate as shown in FIG. 9C is integrally molded to be used for coupling with the housing 2.

In FIG. 15, a reference numeral 12 denotes a Hall IC assembly.

As described above, a stator molded with an insulation material on the whole surface is used for a washing machine. Thus, the motor adopting the stator according to the present invention can be used in a washing machine which operates at a high humidity condition during washing without requiring an additional insulation material. Also, sharp edges which can hurt workers are hidden to thus assuring a safety.

Figure 13A:
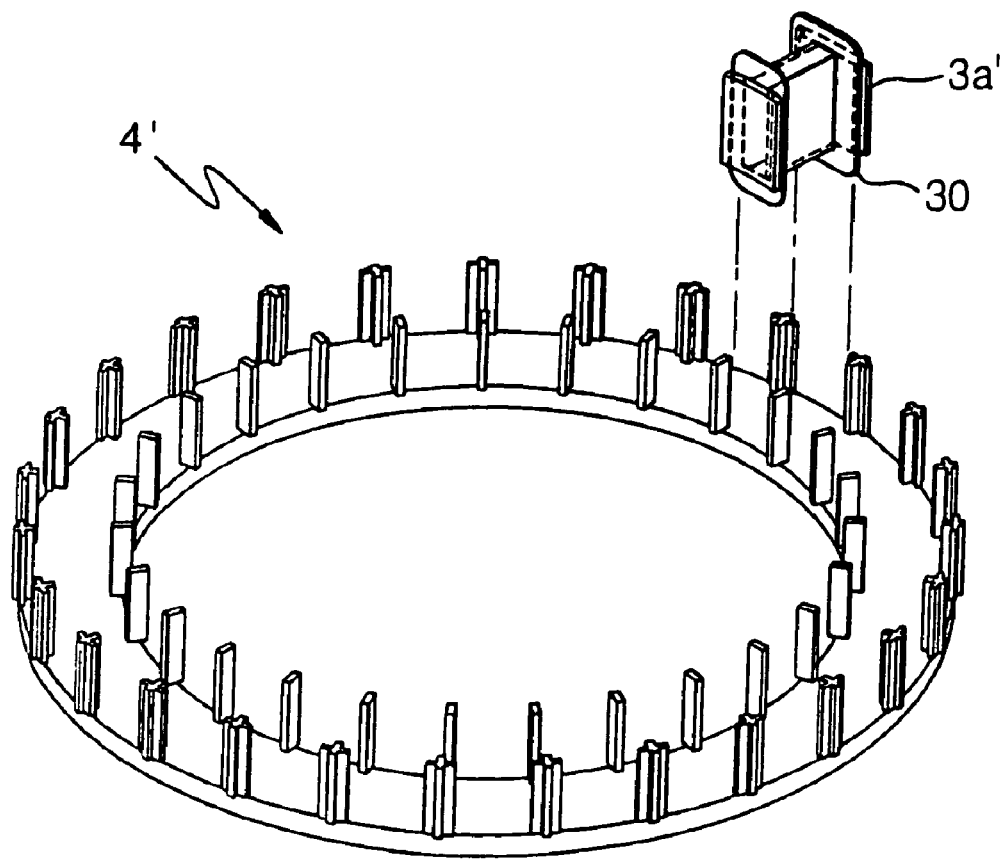
Figure 13B:
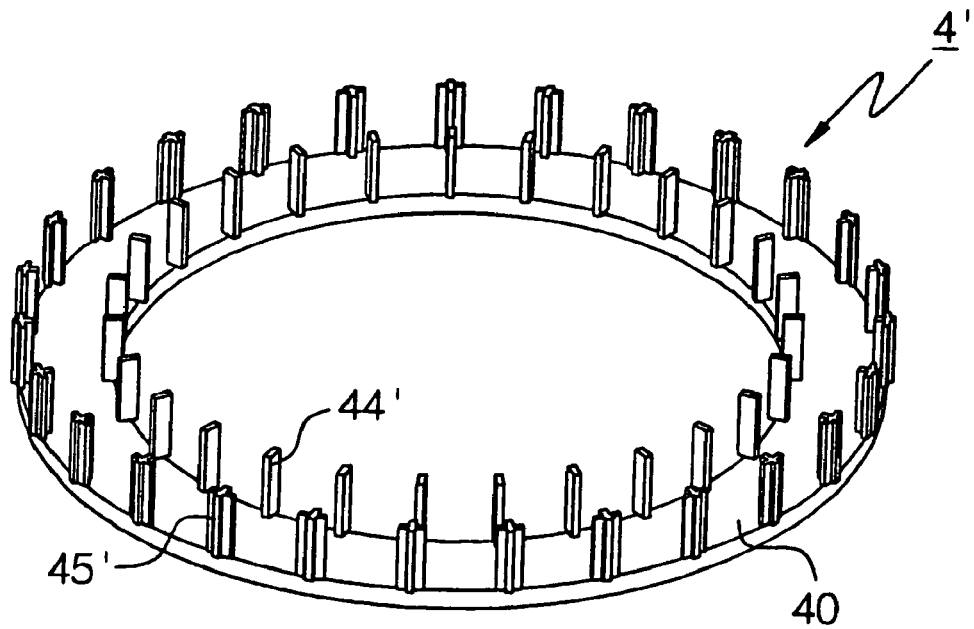
Figure 13C:
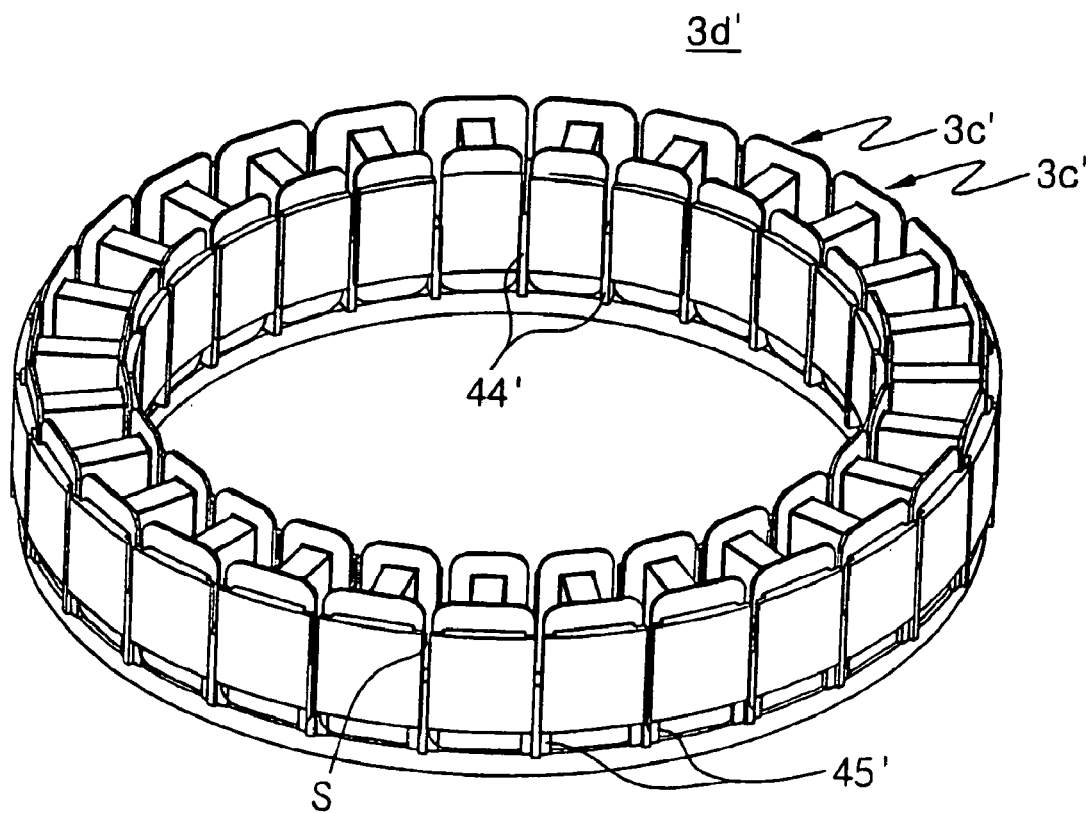
Figure 13D:
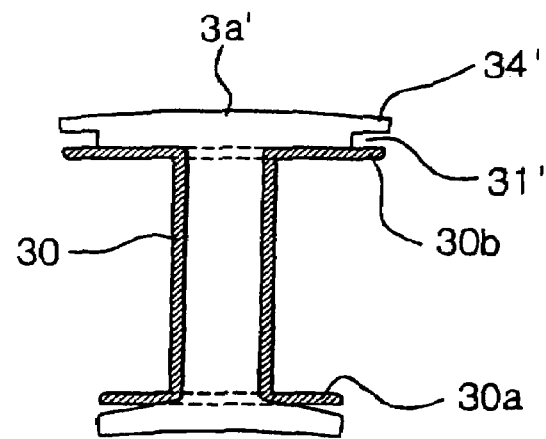

FIGS. 13A through 13D are views showing a second embodiment of the present invention, in which FIG. 13A is an exploded perspective view showing a relationship of coupling a stator core assembly and a core support plate, FIG. 13B is an enlarged perspective view of the core support plate, FIG. 13C is an enlarged view showing a coupling state of the core support plate, and FIG. 13D is a cross-sectional view cut along line A-A of the division type stator core of FIG. 13A.

Referring to FIGS. 13A to 13D, a stator according to a second embodiment of the present invention is shown. Here, a cross-sectional structure of a division type stator core 3a' differs from that of the first embodiment. That is, the vertically formed coupling grooves are not formed in both lateral surfaces of the core 3a', but a number of first and second coupling protrusions 44' and 45' for automatically positioning and supporting a number of stator core assemblies 3c' to an annular core support plate 4' are vertically extended directly from an annular plate 40 without having inner and outer guide flanges.

The core support plate 4' of the second embodiment includes a number of first coupling protrusions 44' whose cross-section is rectangular which is formed at a predetermined interval concentrically inwards from the annular plate 40, and a number of second coupling protrusions 45' whose cross-section is cross-shaped opposing the number of first coupling protrusions 44' formed at a predetermined interval concentrically outwards from the annular plate 40.

Thus, in the second embodiment of the present invention, when a number of stator core assemblies 3c' are assembled to the core support plate 4', the number of first coupling protrusions 44' are disposed between the inner sides of the number of adjacent stator core assemblies 3c' and the number of second coupling protrusions 45' are disposed in a cross-shaped space S formed between the outer sides of the number of adjacent stator core assemblies 3c'. Finally, movement of the assembled stator core assemblies 3c' is restricted. Thus, the second embodiment is simpler than the first embodiment in view of the core support plate 4', and the former also more effectively support the number of stator core assemblies 3c' than the latter.

As described above, an insertion groove 31' is formed in the left and right sides between an outer extension 34' of a division type stator core 3a' and an outer flange 30b of the bobbin 30 in the second embodiment, so that a cross-shaped space S is formed between the outer sides of the adjacent stator core assemblies 3c'.

Since the remaining structure, the assembling process and the functional effect for the stator of the second embodiment are substantially same as those of the first embodiment, the detailed description thereof will be omitted.

Figure 14A:
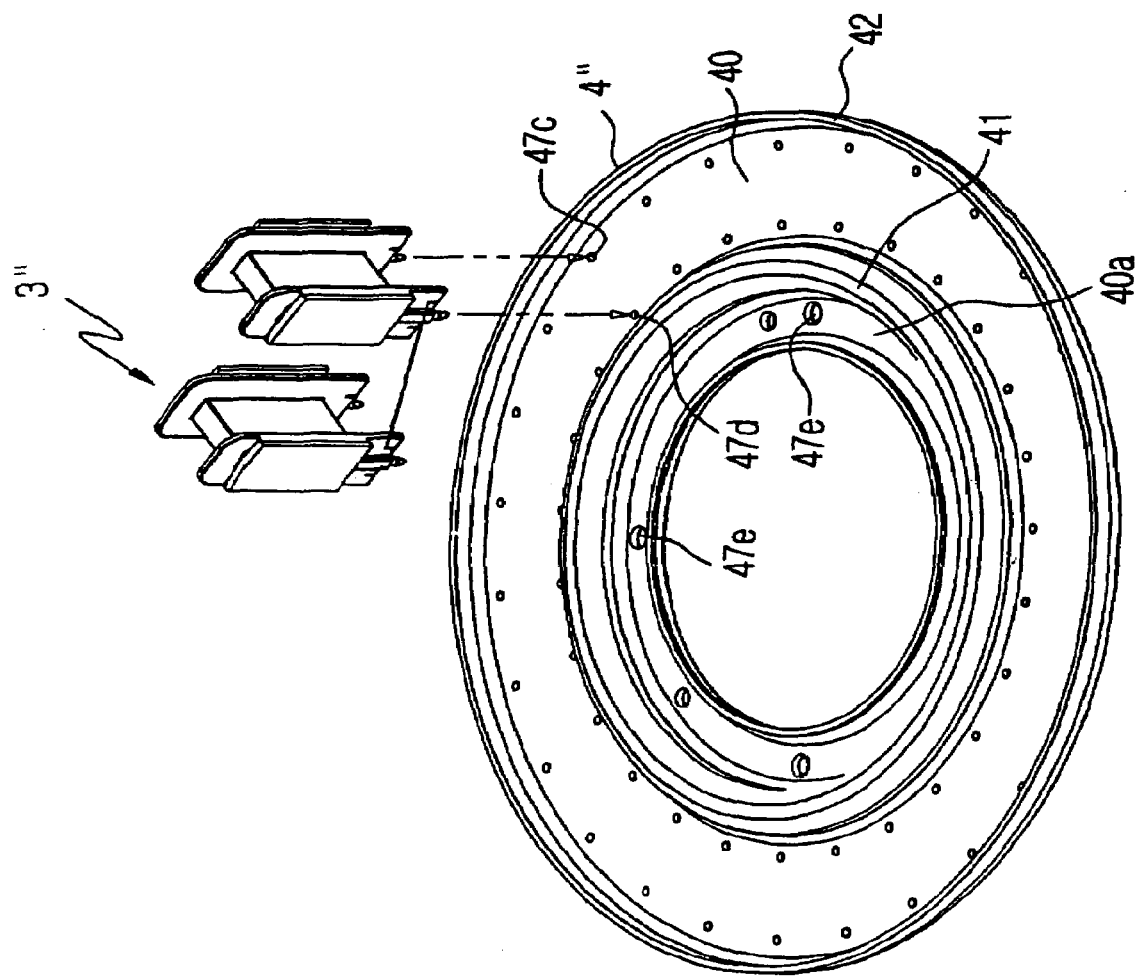
FIG. 14A is an exploded perspective view showing a relationship of coupling a stator core assembly and a core support plate according to a third embodiment of the present invention.
Figure 14B:
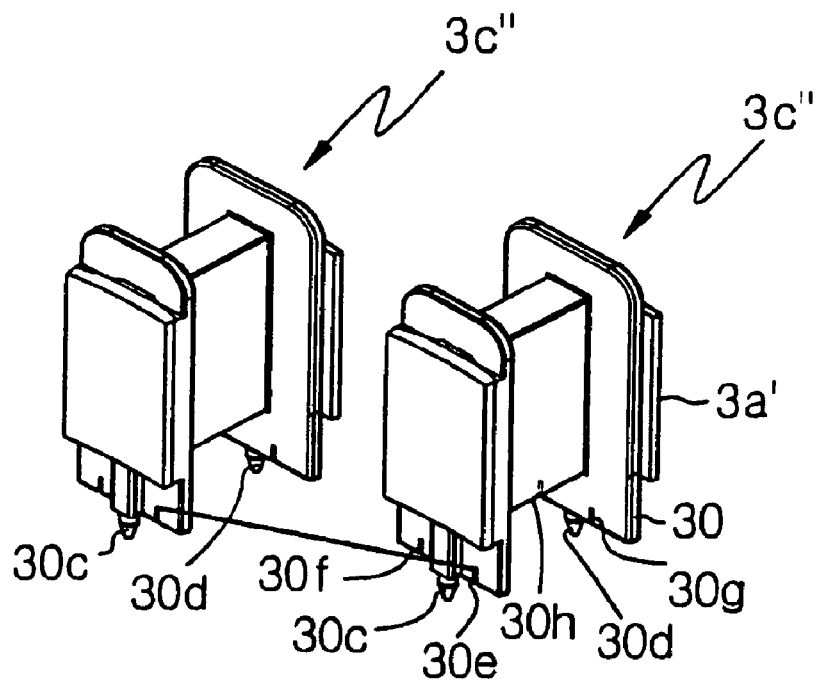
FIG. 14B is an enlarged view showing a division type stator core.

FIG. 14A is an exploded perspective view showing a relationship of coupling a stator core assembly and a core support plate according to a third embodiment of the present invention. FIG. 14B is an enlarged view showing a division type stator core.

Referring to FIGS. 14A and 14B, in the case of a stator according to a third embodiment of the present invention, a structure of a number of stator core assemblies 3c'' is similar to that of the second embodiment. However, coupling protrusions 30c and 30d whose cross-sections are circular or rectangular are extended in the inner portion of the bobbin 30 and the lower portions of the outer flanges 30c and 30b, guide grooves 30e-30h for wiring and guiding coils 3b (not shown) are formed, and coupling holes 47c and 47d corresponding to coupling protrusions 30c and 30d are perforated on the bottom of an annular plate 40 instead of a number of first and second coupling protrusions 44' and 45' so that a number of stator core assemblies 3c'' are automatically positioned and supported on an annular core support plate 4''.

That is, the core support plate 4'' is formed by a press by using a BMC (Bulk Molding Compound) differently from the injection molded core support plates of the first and second embodiments. In order to fix the number of stator core assemblies 3c'', inner and outer guide flanges 41 and 42 are formed in the inner and outer circumferences of the annular plate 40, and simultaneously coupling holes 47c and 47d are perforated on the bottom of the annular plate. Further, an extension 40a where a throughhole 47e through which a stator is fixed in a housing 2 of a washing machine is formed, is integrally formed in the inner circumference of the annular plate 40. When being combined in the housing 2 of the washing machine, the extension 40a plays a role of blocking water leaking from the washing machine and flowing downwards from penetrating into a motor.

Thus, in the stator of the third embodiment, coils are wound around the bobbin 30 where a core 3a' is combined to thereby prepare stator core assemblies 3c'', and then coupling protrusions 30c and 30d are inserted and fixed into coupling holes 47c ad 47d formed in the core support plate 4''. In this case, for example, a fixing structure between the coupling protrusions 30c and 30d and the coupling holes 47c and 47d, prevents a leading end from thermally being spliced and separated after being combined by a compulsive fitting or a hanging structure.

Thereafter, coils taken out from the stator core assemblies 3c'' are mutually wired via the guide grooves 30e-30h, and a number of stator core assemblies 3c'' undergo an insert molding method using thermosetting resin similarly to the first embodiment, to thereby contrive durability and waterproof.

As a result, in the third embodiment, the number of stator core assemblies 3c'' can be simply assembled with the core support plate 4''. In this case, since assembly positions in the radial and circumferential directions for the stator core assemblies 3c'' are automatically determined, an assembly productivity is very excellent.

Meanwhile, in the double rotor BLDC motor according to the present invention as shown in FIG. 9C, the rotor 5 is supported on the yoke frame 8 made of a pair of inner and outer yoke frames 8a and 8b in which the inner and outer rotors 5a and 5b where a number of magnets 6a and 6b oppose each other also play a role of a yoke.

Figure 16:
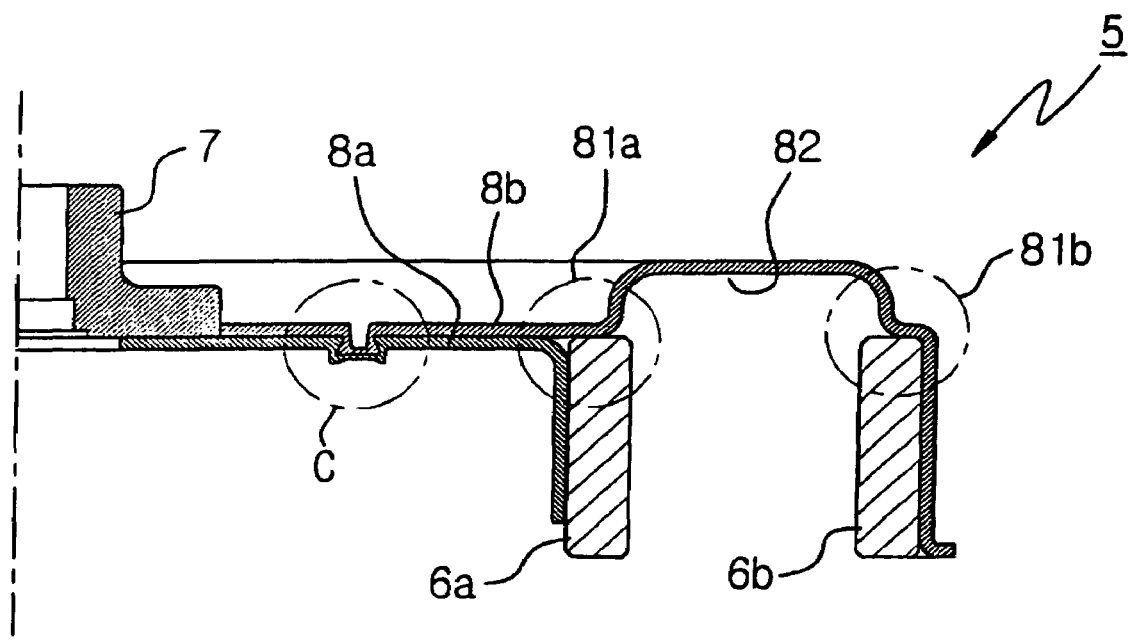
FIG. 16 is a cross-sectional view showing a support structure of double rotors using a double yoke frame according to the present invention.

FIG. 16 is a cross-sectional view showing a support structure of double rotors using a double yoke frame according to the present invention. Inner and outer yoke frames 8a and 8b in a yoke frame 8 are bent by a press, respectively. A first step structure 81a is formed between the bent leading end of the inner yoke frame 8a and the outer yoke frame 8b in which a magnet 6a for an inner rotor 5a is mounted. A second step structure 81b where a magnet 6b for an outer rotor 5b is mounted, is formed in the leading end of the outer yoke frame 8b. An annular groove 82 in which part of the stator 3 can be inserted, is formed between the first and second step structures.

The number of magnets 6a and 6b are made of N-poles and S-poles which are divided and magnetized, or divided pieces as shown in FIG. 1B. Also, a number of opposing magnets which are located in the opposing surfaces in the inner yoke 55 and the outer yoke 56 are disposed to have the opposing polarities, and simultaneously to have the opposing polarities even for the adjacent other magnets.

Figure 17A:
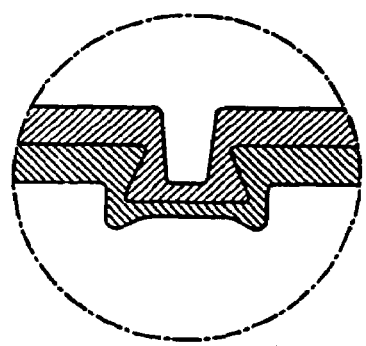
FIGS. 17A through 17D are cross-sectional views showing variations of a coupling structure of a double yoke frame, respectively.
Figure 17B:
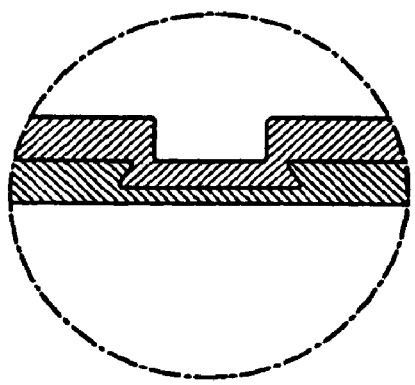
Figure 17C:
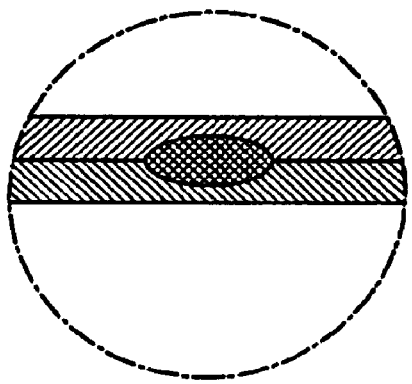
Figure 17D:
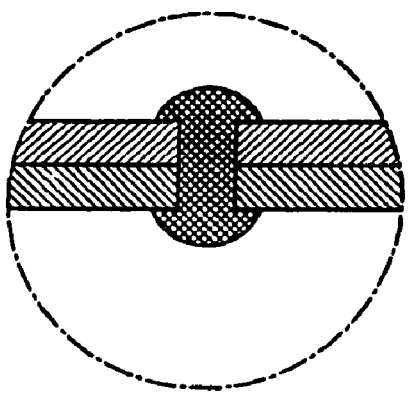

As shown in FIGS. 17A and 17B, the inner and outer yoke frames 8a and 8b can be integrated into a variety of coupling structures "C". That is, the inner and outer yoke frames can be coupled into one of a TOX coupling structure shown in FIG. 17A, a TOX flat coupling structure shown in FIG. 17B, a spot welding coupling structure shown in FIG. 17C, and a riveting coupling structure shown in FIG. 17D.

Figure 18A:
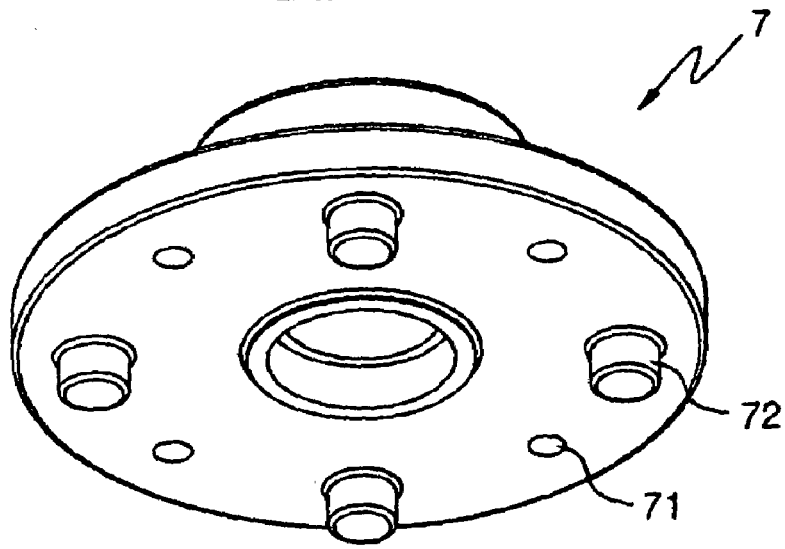
FIGS. 18A and 18B are perspective views of a bushing which is used in the present invention.
Figure 18B:
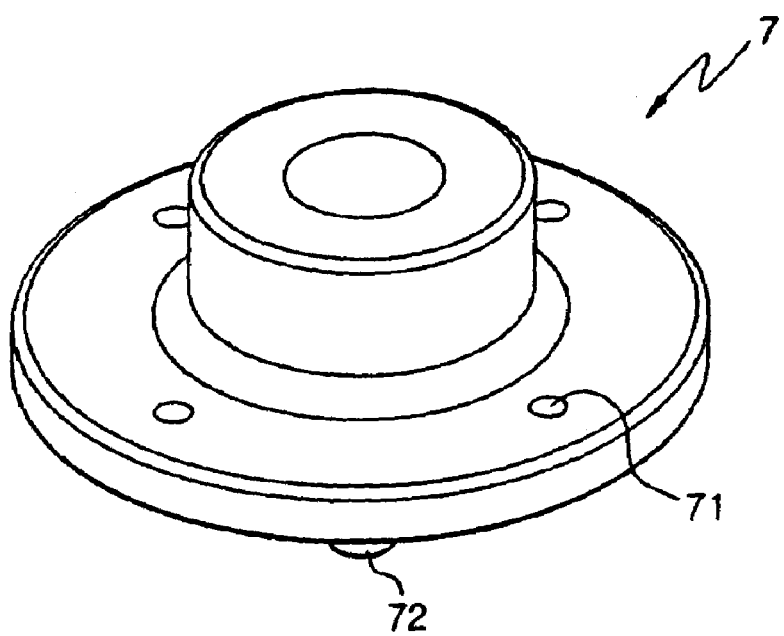
Figure 18C:
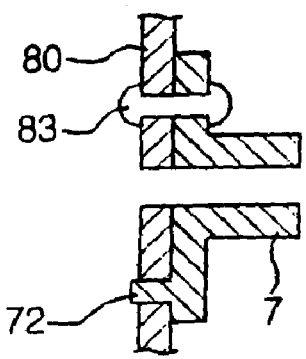
FIG. 18C is a cross-sectional view showing a coupling structure of a bushing by a combination of a rivet and a connection pin.

The inner and outer yoke frames 8a and 8b are coupled with a bushing 7 and supported to the rotational shaft 9. In this case, the bushing 7 are fabricated by sintering or forging as shown in FIGS. 18A and 18B, in which a number of coupling holes 71 are concentrically formed or a number of coupling pins 72 for positioning and torque transferring are alternately protruded between the coupling holes 71, together with the number of coupling holes 71, in order to be combined with the contacting surface of the inner yoke frame 8a by a rivet or a bolt and nut A coupling structure of a combination of a riveting 83 and a coupling pin 72 is shown in FIG. 81C. In the case that the coupling structure is employed, determination of a concentric position and transferring of a rotational force are accomplished by the coupling pin 72, and a coupling between the bushing and the yoke frame is accomplished by a riveting or a bolt and nut combination.

Figure 19B:
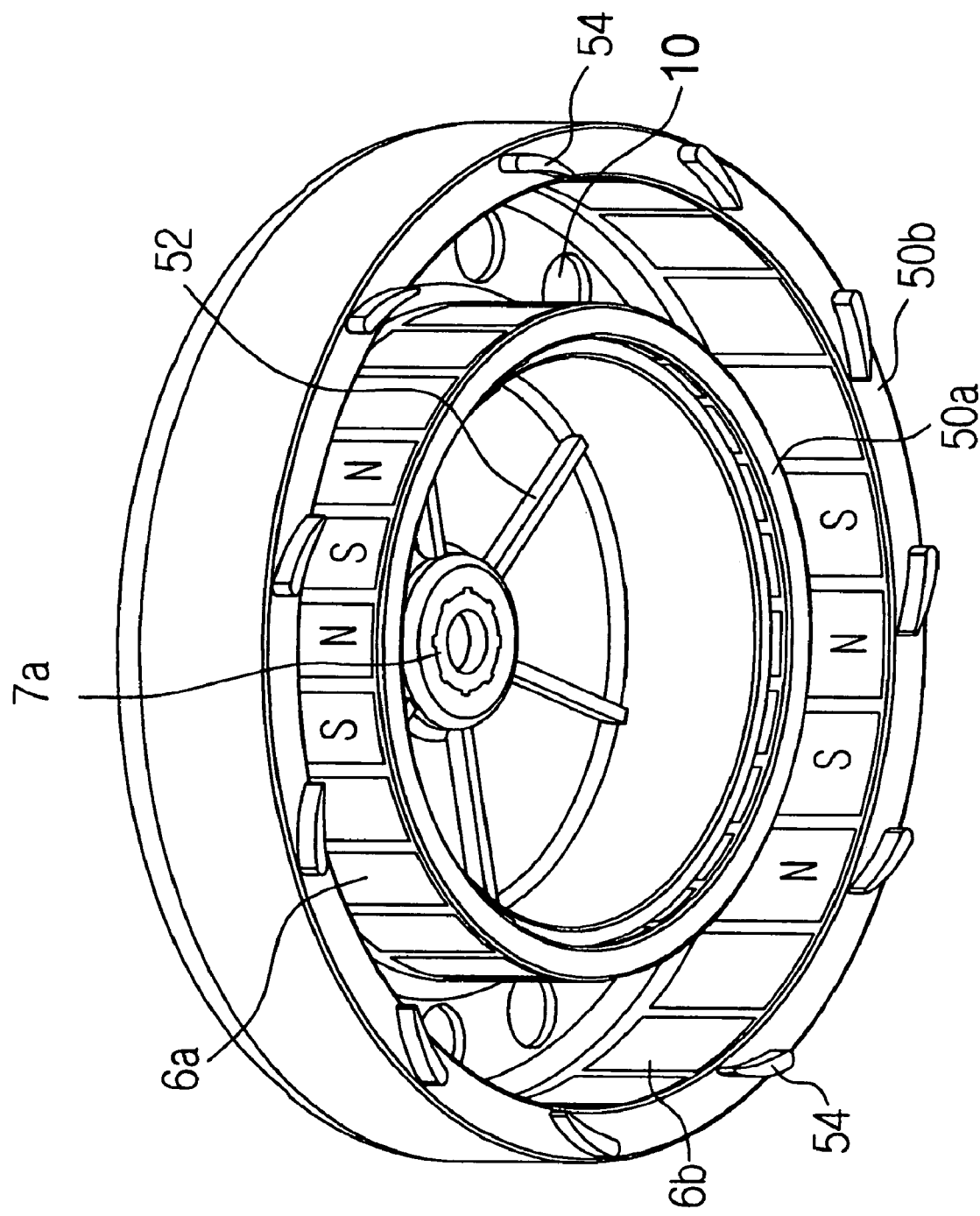
FIG. 19B is a perspective view of FIG. 19A.

Meanwhile, the rotor 5 can be fabricated into an integrated double rotor structure as shown in FIGS. 19A and 19B, in addition to the double yoke frame structure.

The integrated double rotor structure 50 includes an inner rotor 50a where a number of N-poles and S-pole magnets 6a are alternately disposed at the outer side of the annular inner yoke 51a, and an outer rotor 50b where a number of N-poles and S-pole magnets 6b are alternately disposed at the outer side of the annular outer yoke 51b. The inner and outer rotors 50a and 50b are integrally formed by an insert molding method by using a BMC (Bulk Molding Compound) so that a bushing 7a combined with the rotational shaft 9 via a number of ribs 52 which are extended in a radial pattern is supported in the center of the inner and outer rotors 50a and 50b. In this case, molding is performed at the portions other than the opposing surfaces of the magnets 6a and 6b opposing each other in the inner and outer rotors 50a and 50b, and the opposing magnets are disposed to have the mutually opposite polarities.

Also, a number of cooling holes 10 for cooling stator coils inserted between the rotor supports 53 are formed in the rotor supports 53 made of resin between the inner and outer rotors 50a and 50b, and a number of cooling fan blades 54 are integrally formed on the lower surface of the outer rotor 50b. Accordingly, air cooling for the stator is voluntarily accomplished during rotation of the rotors.

As described above, the integrated double rotors 50 according to the present invention does not require a separate support plate since a number of magnets 6a and 6b in the inner and outer rotors 50a and 50b are integrated by using a BMC having a basic structural intensity.

Also, since a number of magnets 6a and 6b in the inner and outer rotors 50a and 50b are disposed concentrically by an insert molding method, a fullness of a circle becomes high. Thus, when the rotors 50a and 50b are assembled with the stator 3, a magnetic gap can be uniformly maintained.

Also, since the rotors and the stator are integrated by using resin in the above-described embodiments, the present invention has an effect of providing an excellent durability and water-proof performance. Thus, the BLDC motor according to the present invention is appropriate for a drum driving source of a washing machine at a high humidity environment, but is not limited thereto. Also, a structure of mounting a stator can be varied according to an apparatus where a motor is applied.

INDUSTRIAL APPLICABILITY

As described above, the BLDC motor according to the present invention can make the most of merits of a double rotor type which can increase a motor output and torque and remove demerits of a high material cost due to a high performance magnet material by providing a motor at which stator coils are completely divided. Also, the present invention makes the most of merits having a small amount of axial vibration of a radial core type motor and removes demerits of a high coil winding cost due to use of the integrated stator core and a high facility investment cost due to use of a dedicated winding machine.

The present invention can greatly enhance productivity of assembling a stator by easily and mutually wiring coils by automatically positioning and fixing a plurality of stator core assemblies to a core support plate when employing a double rotor and division type stator core structure.

Also, the present invention can enhance durability and reliability by integrally molding the inner and outer rotors and bushings via an insert molding method using thermosetting resin. Also, the double rotor structure according to the present invention is appropriate for a driving source of a drum for a washing machine which requires waterproof and durability by integrally molding a stator via an insert molding method using thermosetting resin and combining the stator together with the integrated double rotors.

As described above, the present invention has been described with respect to particularly preferred embodiments. However, the present invention is not limited to the above embodiments, and it is possible for one who has an ordinary skill in the art to make various modifications and variations, without departing off the spirit of the present invention.

What is claimed is:

1. An apparatus for driving a drum of a washing machine:
    a housing of the washing machine;
    a rotational shaft wherein its front portion is connected to the drum and its intermediate portion is rotatably mounted in the housing;
    double rotors including an inner rotor and an outer rotor in which a central portion of the inner rotor and the outer rotor is combined with the rotational shaft via a bushing and is rotatably supported, a plurality of N-pole and S-pole magnets are disposed alternately in annular form on different concentric circumferences in each rotor, and opposing magnets with a predetermined distance between the inner and outer rotors are disposed to have opposite polarities; and
    an annular stator which is installed with an air gap between the inner and outer rotors,
    wherein said stator is an integrated stator molded by using thermosetting resin after each of a number of stator core assemblies is obtained by which coil is wound on each of a number of division type stator cores, and the number of the coil-wound stator core assemblies are temporarily assembled.

2. The driving apparatus of claim 1, further comprising a number of cooling fan blades integrally formed on the lower surface of the outer rotor for air-cooling the stator during rotation of the rotors.

3. The driving apparatus of claim 1, wherein a magnetic circuit is formed through the inner and outer rotors and the number of stator cores which are disposed between the inner and outer rotors with an air gap.

4. The driving apparatus of claim 1, further comprising a Hall sensor located in an extension portion which is extended in a central direction of the stator and is opposed to the lower end of the inner rotor, for generating a position signal detecting position of the rotor rotating in order to control a current supply for the coil.

5. The driving apparatus of claim 1, wherein each of the number of division type stator cores is formed of "I" shape.

6. The driving apparatus of claim 1, wherein the double rotors comprises:

an inner rotor having an inner yoke formed into a cylindrical shape, and a plurality of first N-pole and S-pole magnets which are disposed alternately in annular form on the outer circumferential surface of the inner yoke;

an outer rotor having an outer yoke having a relatively larger diameter than that of the inner yoke so as to maintain a predetermined distance from the inner yoke, and a plurality of second N-pole and S-pole magnets disposed alternately in annular form on the inner circumferential surface of the outer yoke, in which magnets facing the plurality of the first N-pole and S-pole magnets are disposed to have opposite polarities; and a rotor support which is integrated in annular form other than the opposing magnets in the inner and outer rotors, to simultaneously form a space where the stator is inserted between the inner and outer rotors, and is molded with thermosetting resin so that the inner end thereof is connected to the outer circumferential surface of the bushing.

7. The driving apparatus of claim 5, further comprising a number of cooling holes formed in the rotor support for cooling the coils inserted between the inner and outer rotors.

8. The driving apparatus of claim 5, wherein a number of ribs are extended in a radial pattern between the bushing and the inner rotor, which are integrally formed with the inner and outer rotors.

9. The driving apparatus of claim 5, wherein the number of stator core assemblies are temporarily assembled to an annular core support plate by an automatic positioning and supporting unit which automatically positions and supports the number of stator core assemblies to the core support plate with the predetermined interval.

* * * * *